United States Patent
Nagata

Patent Number: 5,978,158
Date of Patent: Nov. 2, 1999

[54] PHOTOTAKING LENS SYSTEM

[75] Inventor: Tetsuo Nagata, Hachioji, Japan

[73] Assignee: Olympus Optical Co., Ltd., Tokyo, Japan

[21] Appl. No.: 08/949,148

[22] Filed: Oct. 10, 1997

[30] Foreign Application Priority Data

Oct. 11, 1996 [JP] Japan .................................. 8-269615

[51] Int. Cl.$^6$ .................................................. G02B 13/04
[52] U.S. Cl. .......................... 359/753; 359/558; 359/740; 359/793
[58] Field of Search .................................. 359/749–756, 359/761, 763, 770–771, 784, 793, 739–742, 680–682, 689, 691, 558

[56] References Cited

U.S. PATENT DOCUMENTS

| | | | |
|---|---|---|---|
| 5,148,314 | 9/1992 | Chen | 359/642 |
| 5,768,030 | 6/1998 | Estelle et al. | 359/691 |

OTHER PUBLICATIONS

Stone et al., "Hybrid diffractive–refractive lenses and achromats", Applied Optics, vol. 27, No. 14, Jul. 15, 1988, pp. 2960–2971.

William C. Sweatt, "New Methods of Designing Holographic Optical Elements", SPIE vol. 126 Clever Optics, 1977, pp. 46–53.

Shingo, Kashima, Patent Abstracts of Japan, 06347700 A, Dec. 1994.

Shingo, Kashima, Patent Abstracts of Japan, 06331898 A, Dec. 1994.

Keiichi, Hisayoshi, Patent Abstracts of Japan, 06331941 A, Dec. 1994.

Mitsujiro, Konno, Patent Abstracts of Japan, 06194571 A, Jul. 1994.

Tsutomu, Uzawa, Patent Abstracts of Japan, 06148518 A, May 1994.

Tsutomu, Uzawa, Patent Abstracts of Japan, 06107070 A, Apr. 1994.

Kazuo et al., Patent Abstracts of Japan, 06230275 A, Aug. 1994.

Hisashi, Goto, Patent Abstracts of Japan, 06324262 A, Nov. 1994.

Masahito, Kikuchi, Patent Abstracts of Japan, 07333499 A, Dec. 1995.

Manufacture of Voltage–Dependent Nonlinear Resistor Ceramic Composition and Varistor, 4–43607, 1990.

Masahiko, Tanitsu, Patent Abstracts of Japan, 08005908, Jan. 1996.

*Primary Examiner*—Georgia Epps
*Assistant Examiner*—Jordan M. Schwartz
*Attorney, Agent, or Firm*—Pillsbury Madison & Sutro LLP

[57] ABSTRACT

The invention provides an inexpensive phototaking lens system comprising a reduced number of lenses, which makes use of a diffractive optical element to make correction for first-order longitudinal chromatic aberration and chromatic aberration of magnification, and eliminates higher-order chromatic aberrations of magnification produced in a wide-angle lens system. The phototaking lens system comprises a front group having negative power, an aperture stop and a rear group having positive power, with the rear group comprising at least one positive lens and a diffractive optical element having a diffractive surface D of positive power, and satisfies conditions for making good correction for chromatic aberrations produced at a refractive system with the diffractive optical element and conditions for making well-balanced correction for longitudinal chromatic aberration and chromatic aberration of magnification.

10 Claims, 5 Drawing Sheets

PHOTOTAKING LENS SYSTEM

BACKGROUND OF THE INVENTION

1. Field of the Invention

The present invention relates generally to a phototaking lens system, and more particularly to a phototaking lens system used with electronic cameras using CCD imaging elements, video cameras, monitor cameras, cameras mounted on vehicles, etc.

2. Discussion of Related Art

So far, phototaking lens systems using imaging elements such as CCDs have been required to have a good telecentric property on image sides thereof for the purpose of preventing color shading due to color filters located in front of solid-state image elements or light bundle leaks due to microlenses. The phototaking lens systems are also required to have a back focus long enough to receive optical elements such as low-pass and color filters between the final surfaces thereof and the imaging elements. For this reason, they are often designed in the form of a retrofocus type comprising two groups, one being a front group having negative power and the other a rear group having positive power. This retrofocus type is favorable for making sure of the back focus, but tends to produce large quantities of off-axis aberrations such as coma, astigmatism and distortion because the lens layout is asymmetric with respect to an aperture stop so that a light bundle diverged by the front group is converged by the rear group. For a phototaking lens system having a wide field angle, a doublet consisting of a low-dispersion convex lens and a high-dispersion concave lens is often located between an aperture stop and an image side thereof for the purpose of making good correction for chromatic aberrations. To keep the same power throughout the rear group, therefore, it is required to increase the power of the positive lens. To make good correction for the off-axis aberrations and the chromatic aberrations as well, therefore, it is required to increase the number of lenses involved. However, this is undesirable because of an increase in the cost of the lens system. Such problems may be solved by making the powers of individual optical elements weak, but another problem arises, that is, the overall length of the lens system becomes too long. Recently developed wide-angle lens systems comprising a reduced number of lenses, for instance, are disclosed in JP-A's 6-148518, 7-333499 and 8-5908. These lens systems are each composed of a small number of lenses, for instance, three or four lenses, with a rear group comprising a doublet consisting of a low-dispersion positive lens and a high-dispersion negative lens, thereby making correction for chromatic aberrations. A wide-angle lens system well corrected for off-axis aberrations and chromatic aberrations, for instance, is disclosed in JP-A 6-107070. This lens system comprises about five lenses, as described in examples of the publication.

On the other hand, JP-A's 6-230275 and 4-43607 disclose wide-angle lens systems comprising two lenses, i.e., a negative lens and a positive lens, each having a Fresnel lens surface. A Fresnel lens makes use of the refraction of light, and makes good correction for off-axis aberrations due to its aspheric effect but has little action on the correction of chromatic aberrations, i.e., longitudinal chromatic aberration and chromatic aberration of magnification.

Recently, attention has been paid to a diffractive optical element (DOE) making use of a diffraction phenomenon. Unlike a conventional refractive lens, the DOE is optically characterized by having inverse dispersion and extraordinary dispersion properties, as expressed by an Abbe number $\nu=-3.453$. This has already been proposed in an article by Thomas Stone and Nicholas George, "Hybrid diffractive-refractive lenses and achromats", Applied Optics, 27, 14, 2960–2971 (1988.7.15). It is thus well known to utilize these properties to make correction for chromatic aberrations with a cemented lens consisting of a refractive lens having positive power and a diffractive optical element having weak positive power. This is more favorable than a conventional cemented lens in view of the correction of aberrations because the powers of individual lenses can be diminished due to the fact that they are positive, so that off-axis aberrations can be reduced.

In recent years, many optical systems using DOEs have been put forward. Examples of U.S. Pat. No. 5,148,314 disclose eyepieces, Petzval type lenses, large-aperture lenses, telephoto lenses, etc., and teach that if DOEs are used in these optical systems, it is then possible to make correction for chromatic aberration, and other off-axis aberrations. Further, JP-A's 6-324262, 6-331898, 6-331941 and 6-347700 filed by the applicant disclose applications of DOEs to telephoto lenses, objectives, projection lenses, etc. One application of a DOE to a wide-angle lens system is an endoscope objective disclosed in JP-A 6-194571 filed by the applicant. However, one example of this publication discloses an optical system peculiar to an endoscope objective which, albeit having a wide angle, produces considerably large distortion. Thus, this system is not preferable for the field to which the present invention belongs.

Some wide-angle lens systems comprising a reduced number of lenses are available, as disclosed in JP-A's 6-148518, 7-333499 and 8-5908. These systems are well corrected for longitudinal chromatic aberration, but cannot be for chromatic aberration of magnification and off-axis aberrations. A wide-angle lens system sufficiently corrected for longitudinal chromatic aberration and chromatic aberration of magnification, and satisfactorily corrected for off-axis aberrations as well, for instance, is disclosed in JP-A 6-107070. For this lens system, however, it is required to increase the number of lenses inclusive of a cemented lens.

In view of the aforesaid problems with conventional lens systems, it is a primary object of the present invention to provide an inexpensive phototaking lens system comprising a reduced number of lenses, which makes use of a diffractive optical element to make good correction for first-order longitudinal chromatic aberration and chromatic aberration of magnification while high image-forming capability is maintained even at peripheral areas of the field angle, and which can eliminate higher-order chromatic aberrations of magnification produced in a wide-angle lens system.

SUMMARY OF THE INVENTION

In accordance with the present invention, the aforesaid object is achieved by the provision of a phototaking lens system comprising, in order from an object side thereof, a front group having negative power, an aperture stop, and a rear group having positive power, characterized in that a lens in said front group, said lens being located closest to said object side, comprises a lens that is convex on said object side, said rear group comprises at least one positive lens and a diffractive optical element having a diffractive surface having positive power, and said phototaking lens system satisfies the following conditions (1) and (2):

$$0.02 < \phi_{DOE}/\phi < 0.20 \quad (1)$$

$$0.2 < D_{DOE}/f < 3.0 \quad (2)$$

where φ and f are the power and focal length of said phototaking lens system, respectively, $\phi_{DOE}$ is the power of said diffractive surface from which the power of a diffractive optical element substrate is excluded, and $D_{DOE}$ is the distance from said aperture stop to said diffractive surface.

Preferably in this case, between the aperture stop and the diffractive surface there is included a refractive optical element having refractive action lying within a range defined by the following condition (3) and an exit pupil position of an optical sub-system located between the diffractive surface and the object side lies within a range defined by the following condition (4):

$$0<\phi_{REF}/\phi<0.9 \quad (3)$$

$$-0.2<f/EXP_{DOE}<0.42 \quad (4)$$

where $\phi_{REF}$ is the power of the refractive optical element from which the power of the diffractive optical element is excluded, and $EXP_{DOE}$ is the distance from the exit pupil position to the diffractive surface.

According to the present invention, it is also preferred to satisfy the following conditions (5) and (6):

$$-0.8<f/f_F<-0.2 \quad (5)$$

$$0.5<D_{FS}/f<2.2 \quad (6)$$

where $f_F$ is the focal length of the front group, and $D_{FS}$ is the distance from an apex of an object-side surface in the front group to the aperture stop.

Reference will now be made to why the aforesaid arrangements are used and how they act.

A retrofocus type of phototaking lens system produces paraxially longitudinal chromatic aberrations; that is, the front group located between the aperture stop and the object side produces positive chromatic aberration while the rear group located between the aperture stop and the image side produces negative chromatic aberration. Referring here to chromatic aberrations of magnification, both the front and rear groups produce negative chromatic aberrations. Thus, the longitudinal chromatic aberrations can be canceled out by the front and rear groups, but the chromatic aberrations of magnification cannot. To achieve the target performance, therefore, a conventional retrofocus lens system is constructed of front and rear groups, each comprising a plurality of positive and negative lenses, whereby the quantities of longitudinal chromatic aberration and chromatic aberrations of magnification produced by each group are kept small. With this technique, however, the front and rear groups must be each composed of a plurality of lenses, resulting in an unavoidable increase in the number of lenses involved.

On the other hand, a retrofocus lens system may be designed in such a manner that one of the front and rear groups produces positive chromatic aberration of magnification, thereby canceling out chromatic aberrations of magnification by the front and rear groups. In this arrangement, for instance, a chromatic aberration corrector may be located in the front group so that the front group produces positive chromatic aberration of magnification. In this case, however, such a chromatic aberration corrector produces negative longitudinal chromatic aberration which can hardly be corrected all over the phototaking lens system. It is thus not preferable to make correction for the longitudinal chromatic aberration by producing positive chromatic aberration of magnification at the front group. If, for instance, a lens of negative power is located in the rear group, it is then possible for the rear group to produce positive chromatic aberration of magnification. However, the power of the positive lens component must be increased to keep the power of the rear group constant. Consequently, it is very difficult to make correction for negative longitudinal chromatic aberration produced at a positive lens component in an ordinary combination of refractive lens components.

If a diffractive optical element is used as the chromatic aberration corrector to be located in the rear group, however, positive chromatic aberration of magnification is produced with positive power because the dispersion property of the DOE is quite opposite to that of an ordinary refractive lens. It is thus possible to produce positive chromatic aberration of magnification at the rear group without giving rise to any increase in the power of the positive lens in the rear group. In summary, it is most preferable to locate in the rear group a diffractive optical element having such an inverse dispersion property and capable of producing positive chromatic aberration of magnification with positive power so that, with a reduced number of lenses, positive chromatic aberration of magnification is produced at one of the front and rear groups to cancel out chromatic aberrations of magnification by the front and rear groups. The DOE can make correction even when its power is very weak because it has an Abbe number of −3.45 and a high dispersion property as well. For this reason, it is possible to locate the DOE in a phototaking lens system comprising many lenses with no substantial paraxial quantity change, thereby making better correction for chromatic aberrations. Examples set forth in the aforesaid publications teach to use a cemented lens to make correction for chromatic aberrations. If the DOE is used in the rear group, however, it is possible to make good correction for longitudinal chromatic aberration and aberration of magnification without using any lens of negative power, so that the quantity of off-axis aberrations produced can be minimized with no need of increasing the power of the positive lens in the rear group.

The diffractive optical element can have aspheric effect depending on a zonal spacing change, and so enables off-axis aberrations produced at the refractive optical element in the phototaking lens system, especially coma and astigmatism to be well corrected. DOEs having such aspheric effect are fabricated in the same manner as in the case of ordinary DOEs having spherical effect, and so can be manufactured with ease.

By making the surface of the lens closest to the object side convex on the object side, it is possible to make the angle of incidence of off-axis rays on the convex surface closest to the object side small. In this case, the retrofocus type produces off-axis aberrations, particularly large negative distortions at the front and rear groups. However, since the distortion having a negative value can be minimized at the front group, good image-forming capability can be obtained even at peripheral areas of the field angle.

Condition (1) is provided to make good correction for chromatic aberrations produced at the lens in the refractive sub-system by the diffractive optical element, and to determine the power profile of the DOE throughout the phototaking lens system. When the lower limit of 0.02 in condition (1) is not reached, the power of the DOE becomes very weak. This is not preferable because longitudinal chromatic aberration and chromatic aberration of magnification produced at the aforesaid refractive sub-system remain undercorrected. This is also not preferable because the zonal spacings on the DOE become very large, not only resulting in a lowering of diffraction efficiency due to a decrease in the number of zones contained in the diameter of a light bundle, but also resulting in refractive action having an adverse influence on a lowering of the inverse dispersion property and extraordinary dispersion property of the DOE. As a result, the chromatic aberrations cannot be corrected as is the case with a Fresnel lens. Exceeding the upper limit of 0.20 in condition (1) is not preferable because spectra on a long wavelength side remain overcorrected due to the extraordinary dispersion property of the DOE. An increase in the power of the DOE makes zonal spacings too fine to fabricate the DOE.

Preferably, condition (1) reduces to the following condition (11):

$$0.043<\phi_{DOE}/\phi<0.175 \qquad (11)$$

Condition (2) is provided to make well-balanced correction for longitudinal chromatic aberration and chromatic aberration of magnification, and to properly determine where the DOE is located in the phototaking lens system as well.

When the lower limit of 0.2 in condition (2) is not reached, the position where the diffractive optical element is located is too close to the aperture stop, and so the ray height of an axial bundle becomes high while the ray height of an off-axis bundle becomes low. This is not preferable because longitudinal chromatic aberration remains overcorrected whereas chromatic aberration of magnification remains undercorrected. In addition, the angle of incidence of the off-axis bundle on the DOE is larger than that of the axial bundle, resulting in a diffraction efficiency drop. FIG. 10 is a schematic illustrative of how light bundles are vertically incident on a diffractive optical element 10, and FIG. 11 is a schematic illustrative of how light bundles are obliquely incident on the element 10. Upon vertical incidence, it is theoretically possible to obtain a diffraction efficiency of 100% with respect to a particular wavelength, so that all light is diffracted at a diffraction angle Od, as can be seen from FIG. 10. Upon oblique incidence of light bundles as depicted in FIG. 11, however, a light bundle on a range AT of a blaze surface of a diffraction grating is diffracted with an ideal diffraction angle in a direction of a light ray 1, but a light bundle incident on a portion of the blaze surface where its phase changes sharply is diffracted or otherwise reflected in another direction as shown by a light ray 2, causing a diffraction efficiency drop. This significantly affects the off-axis bundle or axial marginal rays to which the zonal spacing T becomes narrow, that is, a light bundle incident on a portion of the DOE where the value of T is small with respect to groove depth, results in a diffraction efficiency drop. Now let the value of ΔT/T denote the duty ratio and $\eta_0$ represent the diffraction efficiency upon vertical incidence. Then, the diffraction efficiency ill upon oblique incidence is approximately given by the following equation (12):

$$\eta_1=(\Delta T/T)^2\eta_0 \qquad (12)$$

For details of this, for instance, see an article by Gary J. Swanson, "Binary Optics Technology: Theoretical Limits on the Diffraction Efficiency of Diffractive Optical Element", Lincoln Laboratory. MIT Tech. Report TR-914. Thus, the most important problem with a lens system using a diffractive optical element is such a diffraction efficiency drop. This in turn causes undesirable ghost, and flare problems. When the upper limit of 3.0 in condition (2) is exceeded, chromatic aberration of magnification may be well corrected. However, this is not preferred partly because the total length of the phototaking lens system becomes too long, and partly because the negative power of the front group must be increased to make sure of a long back focus, so rendering it difficult to correct off-axis aberrations.

More preferably, condition (2) reduces to the following condition (13):

$$0.4<D_{DOE}/f<2.2 \qquad (13)$$

Preferably, the phototaking lens system of the present invention includes, between the aperture stop and the diffractive surface, a refractive optical element having refractive action lying within the range defined by the following condition (3). More preferably, the exit pupil of an optical sub-system located between the diffractive surface and the object side is in a position within the range defined by the following condition (4).

$$0<\phi_{REF}/\phi<0.9 \qquad (3)$$

$$-0.2<f/EXP_{DOE}<0.42 \qquad (4)$$

where $\phi_{REF}$ is the power of the refractive optical element from which the power of the diffractive optical element is excluded, and $EXP_{DOE}$ is the distance from the exit pupil position to the diffractive surface.

Condition (3) is provided to shorten the total length of the phototaking lens system, and to make the angle of incidence of an off-axis bundle on the diffractive optical element vertical or substantially vertical as well. This is also provided to determine the power profile of the optical element having refractive action from the aperture stop to the diffractive surface. Condition (4), too, is provided to make the angle of incidence of an off-axis bundle on the diffractive optical element substantially vertical, and to determine the distance from the exit pupil of an optical sub-system located between the diffractive surface and the object side to the diffractive surface as well.

When the lower limit of 0 in condition (3) is not reached or when the upper limit of 0.42 in condition (4) is exceeded, the angle of incidence of off-axis rays on the diffractive optical element is larger than that of the axial bundle, and so the diffraction efficiency drop becomes noticeable as off-axis rays increase. This in turn makes the image quality of peripheral areas of the field angle worse, and makes flare apt to occur as well. When the upper limit of 0.9 in condition (3) is exceeded, the power of the front group must be increased to make sure of the back focus. This is not preferable because the powers of individual optical elements become too strong to render coma and astigmatism worse. When the lower limit of −0.2 in condition (4) is not reached, the power of the positive lens located in the rear group becomes too strong, and so spherical aberration remains considerably undercorrected. In addition, the positive lens is larger than the imaging element, resulting in increases in device size and cost. Moreover, it is impossible to ensure a sufficient back focus. This may be achieved by increasing the negative power of the front group; however, it is then difficult to correct off-axis aberrations.

More preferably, condition (3) reduces to the following condition (14):

$$0.3<\phi_{REF}/\phi<0.85 \qquad (14)$$

Most preferably, condition (3) reduces to the following condition (15):

$$0.5 < \phi_{REF}/\phi < 0.85 \tag{15}$$

More preferably, condition (4) reduces to the following condition (16):

$$0 < f/EXP_{DOE} < 0.42 \tag{16}$$

This is because the angle of incidence of the off-axis bundle on the DOE is kept substantially vertical and, at the same time, the size of the optical elements in the rear group is more reduced.

Most preferably, condition (4) reduces to the following condition (17):

$$0.03 < f/EXP_{DOE} < 0.40 \tag{17}$$

This is because the size of the optical elements in the rear group is much more reduced.

The retrofocus lens system of the present invention is required to have a back focus long enough to receive optical elements such as low-pass and color filters between the final surface of the phototaking lens system and the imaging element. For this reason, the power profile of the front group must be properly determined; in other words, a sufficient back focus can be ensured by allowing the power profile of the front group to satisfy the range defined by the following condition (5). Size and cost reductions are now strongly demanded for every system, to say nothing of phototaking lens systems. If the distance from the apex of the surface in the front group, in which the surface is closest to the object side, to the aperture stop is designed to be within the range defined by the following condition (6), it is then possible to reduce the size of a phototaking lens system while its image-forming capability is maintained, especially the size of the lens located in the front group, and hence to achieve cost reductions. Thus, $$-0.8 < f/f_F < -0.2 \tag{5}$$

$$0.5 < D_{FS}/f < 2.2 \tag{6}$$

where $f_F$ is the focal length of the front group, and $D_{FS}$ is the distance from an apex of an object-side surface in the front group to the aperture stop.

Exceeding the upper limit of −0.2 in condition (5) is undesirable because the focal length of the front group with respect to the focal length of the overall phototaking lens system becomes too long to make sure of the back focus. With the lower limit of −0.8 in condition (5) not reached, it is advantageous to make sure of the back focus. However, the powers of individual lenses become too strong to render aberrations, especially distortion, coma and astigmatism worse. This is undesirable because it is difficult to keep the image-forming capability of peripheral areas of the field angle in good condition.

When the lower limit of 0.5 in condition (6) is not reached, the overall length of the phototaking lens system becomes short and the diameter of the lens in the front group becomes small as well. However, it is difficult to correct distortion because the curvature of the surface closest to the object side becomes too small to use the phototaking lens system at a wide field angle. This is also undesirable because high-order chromatic aberrations of magnification become worse and so the image-forming capability of peripheral areas of the field angle becomes extremely worse. Exceeding the upper limit of 2.2 in condition (6) is again undesirable because it is easy to make good correction for aberrations but the diameter of the lens in the front group becomes too large, resulting in cost rises and an increase in the overall length of the phototaking lens system.

More preferably, conditions (5) and (6) reduce to the following conditions (18) and (19), respectively, $$-0.7 < f/f_F < -0.3 \tag{18}$$

$$0.8 < D_{FS}/f < 1.9 \tag{19}$$

It is desired that the phototaking lens system of the present invention is satisfactorily corrected for longitudinal chromatic aberration and chromatic aberration of magnification as well as for spherical aberration and off-axis aberrations. The spherical aberration and off-axis aberrations can be well corrected by conforming to the following conditions (7) and (8):

$$0.2 < R_{12}/D_{2S} < 1.2 \tag{7}$$

$$-1.0 < (R_1 + R_2)/(R_1 - R_2) < 5.0 \tag{8}$$

where $R_{12}$ is the radius of curvature of a surface in the front group, said surface being closest to the image side, $D_{2S}$ is the distance from said surface in the front group to the aperture stop, and $R_1$ and $R_2$ are the paraxial radii of curvature of a refractive lens component in the rear group, as determined on the object side and image side, respectively.

Condition (7) is provided to make good correction for spherical aberration and coma, and to determine the radius of curvature of the surface in the front group as well, said surface being closest to the image side. Falling below the lower limit of 0.2 in condition (7) is not preferable because the angle of refraction of off-axis rays through the phototaking lens system is very large, and so considerable coma is produced. It is here noted that spherical aberration is under-produced at each individual surface in the phototaking lens system while spherical aberration is over-produced at the surface in the front group, said surface being closest to the image side. Therefore, exceeding the upper limit of 1.2 in condition (7) is undesirable because the spherical aberration remains undercorrected.

Condition (8) is provided to keep the image-forming capability of the phototaking lens system in good condition, and to determine the shape of the refractive lens located in the rear group as well. The image-forming capability of the present phototaking lens system tends to become worse, because some considerable off-axis aberrations, especially coma, astigmatism, distortion and curvature of field are primarily produced at the refractive lens having positive power, which is located in the rear group. Often, coma, astigmatism and distortion having opposite signs are produced at the object- and image-side surfaces in the phototaking lens system. Thus, it is desired that individual lenses be used to cancel as much off-axis aberrations as possible and cancel the spherical aberration and coma produced at the front group, thereby reducing aberrations produced in the lens system as much as possible. To this end, it is required to determine the shape of the refractive lens in such a manner that there is no difference in the angle of incidence between the object- and image-side surfaces of the refractive lens. Falling below the lower limit of −1.0 in condition (8) or exceeding the upper limit of 5.0 in condition (8) is not preferable because it is impossible to make good correction for the off-axis aberrations.

More preferably, conditions (7) and (8) reduce to the following conditions (20) and (21):

$$0.37 < R_{12}/D_{2S} < 0.9 \quad (20)$$

$$-0.3 < (R_1+R_2)/(R_1-R_2) < 3.0 \quad (21)$$

To reduce the number of lenses forming the phototaking lens system by as many as possible, it is desired that the front group thereof be composed only of a meniscus lens that is convex on the object side and has negative power, and the rear group thereof comprise at least one positive lens that is a double-convex lens.

By composing the front group of only a meniscus lens having negative power it is possible to provide an inexpensive phototaking lens system with an extremely reduced number of lenses.

More preferably, the phototaking lens system of the present invention satisfies the following condition (22):

$$0 < (R_1+R_2)/(R_1-R_2) < 1.0 \quad (22)$$

Condition (21) is provided to determine the shape of at least one positive lens or double-convex lens in the rear group, and to keep off-axis aberrations in good condition as well. Preferably, a strong curvature is imparted to the image-side surface of the double-convex lens, whereby the angles of incidence of light bundles on the object- and image-side surfaces thereof are so equalized that off-axis aberrations can be reduced as much as possible to keep the image-forming capability of peripheral areas of the field angle in good condition.

To reduce the number of lenses forming the phototaking lens system by as many as possible and make good correction for distortion and chromatic aberration of magnification, it is desired that the front group thereof be composed of a positive lens that is convex on the object side and a lens having negative power, and at least one positive lens in the rear group thereof be a double-convex lens.

By constructing the front group of a positive lens that is convex on the object side and a lens having negative power it is possible to make good correction for off-axis aberrations and keep the image-forming capability of peripheral areas of the field angle in good condition. With a retrofocus type of lens system in particular, it is difficult to correct aberrations because it is so asymmetric with respect to an aperture stop that distortion and chromatic aberration of magnification are produced in the same direction at the front and rear groups with the aperture stop located between them. For this reason, the positive lens having weak power is preferably located in the front group so that the distortion and chromatic aberration of magnification can be produced in opposite directions to reduce aberrations produced throughout the phototaking lens system as much as possible.

It is more preferable that the lens system of the aforesaid construction, too, satisfies condition (22).

Another phototaking lens system provided to achieve the aforesaid object comprises, in order from an object side of said system, a front group having negative power, an aperture stop and a rear group having positive power, characterized in that a lens in said front group, said lens being closest to the object side, consists of a lens that is convex on the object side, said rear group comprises a diffractive optical element in which at least one surface having a given curvature includes a diffractive surface having positive power, and said phototaking lens system satisfies the following conditions (1) and (2):

$$0.02 < \phi_{DOE}/\phi < 0.20 \quad (1)$$

$$0.2 < D_{DOE}/f < 3.0 \quad (2)$$

where $\phi$ and f are the power and focal length of said phototaking lens system, respectively, $f_{DOE}$ is the power of said diffractive surface from which the power of a substrate is excluded, and $D_{DOE}$ is the distance from said aperture stop to said diffractive surface.

A diffractive optical element, when a given curvature is imparted thereto, can have both diffractive action and refractive action. A phototaking lens system using such a diffractive optical element can have a smaller number of lenses forming a refractive sub-system thereof than a phototaking lens system using a diffractive optical element fabricated by forming zones on a plane-parallel plate. By imparting the given curvature to a DOE substrate to divide the power of the refractive optical sub-system in the rear group it is possible to weaken the powers of individual surfaces, thereby minimizing off-axis aberrations in particular. As already noted, one leading cause of the diffraction efficiency drop is the oblique incidence of a light bundle on the DOE. It is thus desired that the light bundle be as vertically incident on the DOE as possible. A phototaking lens system, to which the present invention is applied, should desirably be telecentric on its image side. Therefore, when a diffractive optical element is mounted on a plane surface, the DOE must be located especially at a position of the plane surface close to an image plane to make a light bundle vertically incident thereon. However, if this diffractive optical element is attached to a surface concentric with respect to an aperture stop or a surface having a curvature approximate to that of the concentric surface, it is then possible to prevent any diffraction efficiency drop even when the DOE is placed in the vicinity of the aperture stop. This is because off-axis chief rays are almost vertically incident on the DOE.

More preferably, conditions (1) and (2) reduce to conditions (11) and (13) mentioned above.

For a lens system using a diffractive optical element, it is required to make a light bundle, especially an off-axis bundle as vertically incident on the DOE as possible, thereby minimizing the diffraction efficiency drop that is responsible for the gravest ghost and flare problems. Preferably in the phototaking lens system of the present invention, the curvature of the substrate of the diffractive optical element having a diffractive surface satisfies the following condition (9):

$$-8.0 < C_{DOE} \cdot f < 1.0 \quad (9)$$

where $C_{DOE}$ is the curvature of a surface of the substrate of the diffractive optical element, on which the diffractive surface is located.

Condition (9) is provided to determine the curvature of the substrate of the diffractive optical element having a diffractive surface. Falling below the lower limit of −8.0 in condition (9) is undesirable in view of DOE fabrication because the curvature of the DOE substrate becomes very strong, and so it is extremely difficult to form zonal grooves on the substrate. Exceeding the upper limit of 1.0 in condition (9) is again undesirable because the DOE surface is not concentric with respect to the aperture stop, and so the angle of incidence of an off-axis bundle on the DOE becomes particularly small, resulting in a diffraction efficiency drop.

More preferably, condition (9) reduces to the following condition (23):

$$-5.0 < C_{DOE} \cdot f < 0 \quad (23)$$

Most preferably, condition (9) reduces to the following condition (24):

$$-3.0 < C_{DOE} \cdot f < 0 \quad (24)$$

This is because the diffraction efficiency drop of the DOE is much more reduced.

More preferably, the phototaking lens system of the present invention satisfies the aforesaid condition (3) or conditions (14) and (15).

The retrofocus lens system of the present invention is required to have a sufficiently long back focus. For this reason, the power profile of the front group must be properly determined; in other words, a sufficient back focus can be ensured by allowing the power profile of the front group to satisfy the range defined by the aforesaid condition (5). If the distance from the apex of a surface in the front group, in which the surface is closest to the object side, to the aperture stop is designed to be within the range defined by the aforesaid condition (6), it is then possible to reduce the size of the phototaking lens system while its image-forming capability is maintained, especially the size of the lens located in the front group, and hence to achieve cost reductions.

More preferably, conditions (5) and (6) reduce to the aforesaid conditions (18) and (19).

It is desired that the phototaking lens system of the present invention is satisfactorily corrected for longitudinal chromatic aberration and chromatic aberration of magnification as well as for spherical aberration and off-axis aberrations. In other words, it is desired to satisfy the aforesaid condition (7), and the following condition (10):

$$-1.1 < (R_3 + R_4)/(R_3 - R_4) < 5.0 \quad (10)$$

where $R_3$ is the paraxial radius of curvature of the substrate of the diffractive optical element having a diffractive surface in the rear group, as determined on the object side, and $R_4$ is the paraxial radius of curvature of the substrate of the diffractive optical element having a diffractive surface in the rear group, as determined on the image side.

Condition (10) is provided to determine the shape of the diffractive optical element. Falling below the lower limit of −1.1 in condition (10) or exceeding the upper limit of 5.0 in condition (10) is undesirable because the power of the refractive lens of the DOE substrate becomes weak, resulting in an increase in the overall length thereof. Otherwise, it is required to increase the power of other refractive lens, if any, in the rear group, resulting in the introduction of some considerable off-axis aberrations. Especially when the lower limit of −1.1 in condition (10) is not reached, the diffractive optical element takes a meniscus form that is convex on the object surface side, and so the angle of incidence of an off-axis bundle on the DOE is too acute to incur a diffraction efficiency drop.

More preferably, conditions (7) and (10) reduce to the aforesaid condition (20) and the following condition (25), respectively.

$$-1.0 < (R_3 + R_4)/(R_3 - R_4) < 3.0 \quad (25)$$

For the phototaking lens system of the present invention as explained above, it is also desired to determine the shape of a negative lens in the front group so that off-axis aberrations can be well corrected to keep the image-forming capability of peripheral areas of the field angle in good condition. Referring to distortion in particular, even about 10% distortion often presents pronounced image defects for landscape pictures or portraits. As already described, a retrofocus type of phototaking lens system produces considerably large negative distortion because it is asymmetric with respect to an aperture stop. To make good correction for the distortion it is desired to reduce the quantity of distortion produced at the front and rear groups as much as possible, and especially to minimize negative distortion produced at negative lenses in the front group it is desired that at least one negative lens included in the front group satisfy the following condition (26);

$$1.2 < (R_a + R_b)/(R_a - R_b) < 4.0 \quad (26)$$

where $R_a$ is the paraxial radius of curvature of the negative lens in the front group, as determined on the object side, and $R_b$ is the paraxial radius of curvature of the negative lens in the front group, as determined on the image side.

Condition (26) is provided to reduce the quantity of negative distortion produced at the aforesaid negative lens, and to determine the shape of the aforesaid negative lens as well. Falling below the lower limit of 1.2 in condition (26) is undesirable because the angle of incidence of off-axis chief rays on the object-side surface of the aforesaid negative lens becomes large to such a degree that negative distortion is produced. When the upper limit of 4.0 in condition (26) is exceeded, it is difficult to make the field angle wide. In addition, off-axis aberrations become worse and it is particularly difficult to obtain any Petzval sum, rendering it difficult to keep the image-forming capability of peripheral areas of the field angle in good condition. It is more desired to use for the object-side surface of the aforesaid negative lens component in the front group an aspheric surface whose curvature becomes stronger farther off the optical axis.

More preferably, condition (26) reduces to the following condition (27):

$$1.4 < (R_a + R_b)/(R_a - R_b) < 3.2 \quad (27)$$

When the number of refractive lenses included in the rear group is one, chromatic aberrations and off-axis aberrations are better corrected by conforming to the aforesaid condition (21) or (22), or the following condition (28), whereby the phototaking lens system is made telecentric with respect to the image plane. It is also preferable to introduce an aspheric surface for at least one surface of the positive lens in the rear group. For a converging surface it is preferable to use an aspheric surface whose curvature becomes weaker farther off the optical axis, and for a diverging surface it is preferable to use an aspheric surface whose curvature becomes stronger farther off the optical axis.

$$0 < (R_1 + R_2)/(R_1 - R_2) < 0.7 \quad (28)$$

For the phototaking lens system of the present invention, it is preferable to determine the distance from the aperture stop to the final surface of the phototaking lens system. That is, the phototaking lens system is required to have a back focus long enough to receive an optical element such as a low-pass filter between the final surface of the optical system and the image pickup element. However, it is undesirable to make the length of the rear group in the phototaking lens system longer than required, because there is no space for the low-pass filter, etc. Thus, it is desired to satisfy the following condition (29):

$$0.6 < D_{SL}/f < 3.0 \qquad (29)$$

where $D_{SL}$ is the distance from the aperture stop to the final surface of the phototaking lens system, from which the optical filter is excluded. Falling below the lower limit of 0.6 in condition (29) is undesirable because off-axis aberrations and chromatic aberration of magnification become too worse for correction, and exceeding the upper limit of 3.0 in condition (29) is again undesirable because there is no space for the optical filter, etc., with a further increase in the overall length of the phototaking lens system.

More preferably, condition (29) reduces to the following condition (30):

$$0.8 < D_{SL}/f < 2.5 \qquad (30)$$

When the rear group comprises a plurality of refractive lenses, chromatic aberrations and off-axis aberrations are better corrected by conforming to the following condition (31), while the phototaking lens system is made telecentric with respect to the image plane.

$$-0.3 < (R_1 + R_2)/(R_1 - R_2) < 0.7 \qquad (31)$$

Even when the rear group comprises a plurality of refractive lenses, it is preferable to introduce an aspheric surface for at least one surface of the positive lens in the rear group. For a converging surface it is preferable to use an aspheric surface whose curvature becomes stronger farther off the optical axis.

Still other objects and advantages of the invention will in part be obvious and will in part be apparent from the specification.

The invention accordingly comprises the features of construction, combinations of elements, and arrangement of parts which will be exemplified in the construction hereinafter set from, and the scope of the invention will be indicated in the claims.

DESCRIPTION OF THE PREFERRED EMBODIMENTS

The phototaking lens system of the present invention will now be explained more specifically with reference to Examples 1 to 16.

The Sweatt Model is well known for methods of designing optical systems including a diffractive optical element used herein. For details of this, see W. C. Sweatt, "NEW METHODS OF DESIGNING HOLOGRAPHIC OPTICAL ELEMENT", SPIE Vol. 126, Clever Optics, 46–53 (1977). In this Sweatt Model technique, the diffractive optical element is designed in the form of a virtual refractive lens having a very high refractive index (an ultra-high index lens). In the following examples, too, this technique is used. It is noted that the diffractive optical elements used herein are designed at a wavelength of 576.56 nm and a virtual refractive index of 1001. It is also noted that the aspheric surface of an ultra-high index lens is described by such an ordinary aspheric formula as mentioned below. Here, suppose an optical axis direction to be a Z axis and a direction vertical to the optical axis to be a Y axis. Then, the aspheric surface is represented by the following equation (a):

$$Z = CY^2/[1 + \sqrt{\{1-(1+K)C^2Y^2\}}] + A_4Y^4 + A_6Y^6 + A_8Y^8 + A_{10}Y^{10} \qquad (a)$$

Here C is a curvature at a surface apex (=1/r where r is a radius of curvature), K is a conical coefficient, and $A_4$, $A_6$, $A_8$, and $A_{10}$ are 4th, 6th, 8th, and 10th aspherical coefficients.

It is the surface of the DOE substrate that comes in contact with the diffractive surface at nil thickness. For actual fabrication, a phase change is first found from a difference between the aspheric surface shape of the diffractive surface and the surface shape of the substrate, and the index of refraction. Then, this phase change is calculated as a diffraction grating pitch to form a diffraction grating on the surface of the substrate. In each of the following examples, it is thus the surface of the substrate that acts finally as a lens.

By the power of the DOE referred to herein is intended the power of the DOE itself in the ultra-high index technique. The power of the refractive optical element, especially when the ODE is formed on a substrate having a given curvature, is understood to refer to the power of refractive action of only the substrate of the DOE. Three plane-parallel plates located on the side closest to the image plane are supposed to be an infrared-cut filter, a low-pass filter, and a cover glass of a CCD imaging element, respectively.

FIGS. 1 to 9 are schematics illustrating sections and optical paths of Examples 1, 2, 5, 6, 7, 8, 10, 12 and 14 of the phototaking lens system according to the present invention, as taken along optical axes thereof. In these figures, letters S, D and I represent an aperture stop, a diffractive surface (DOE) and an image plane, respectively.

Figure 2:
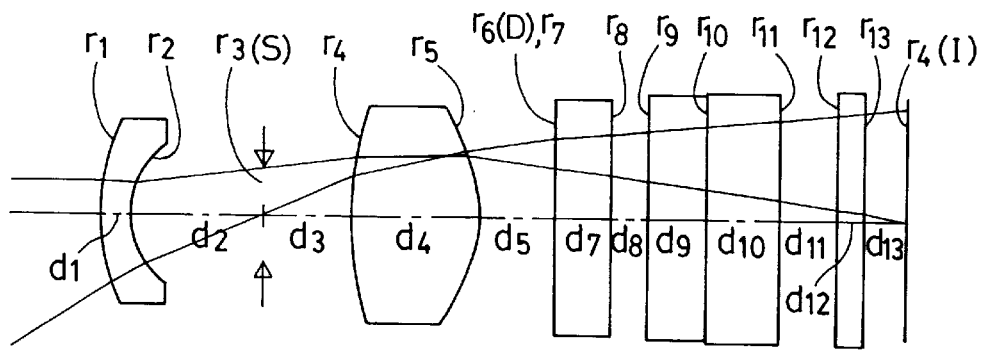
FIG. 2 is a schematic illustrating a section and optical path of Example 2 of the phototaking lens system according to the present invention, as taken along an optical axis thereof.
Figure 7:
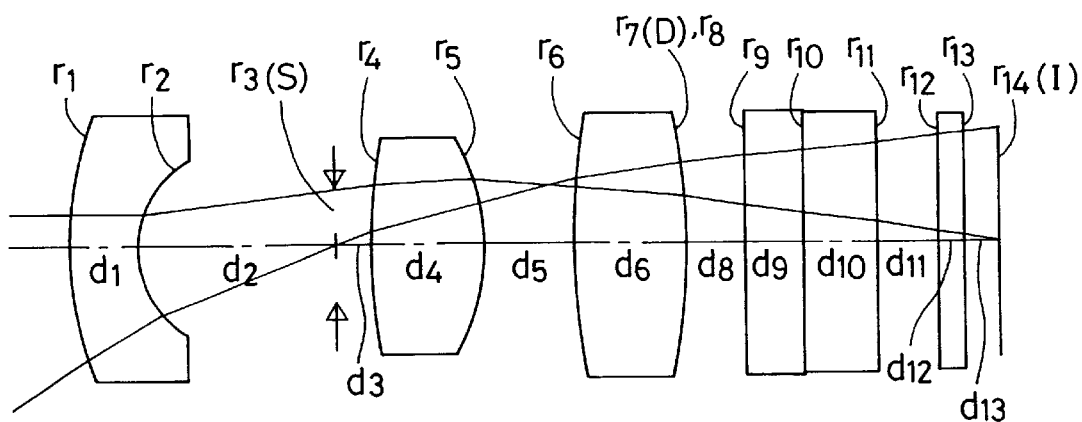
FIG. 7 is a schematic illustrating a section and optical path of Example 10 of the phototaking lens system according to the present invention, as taken along an optical axis thereof.
Figure 8:
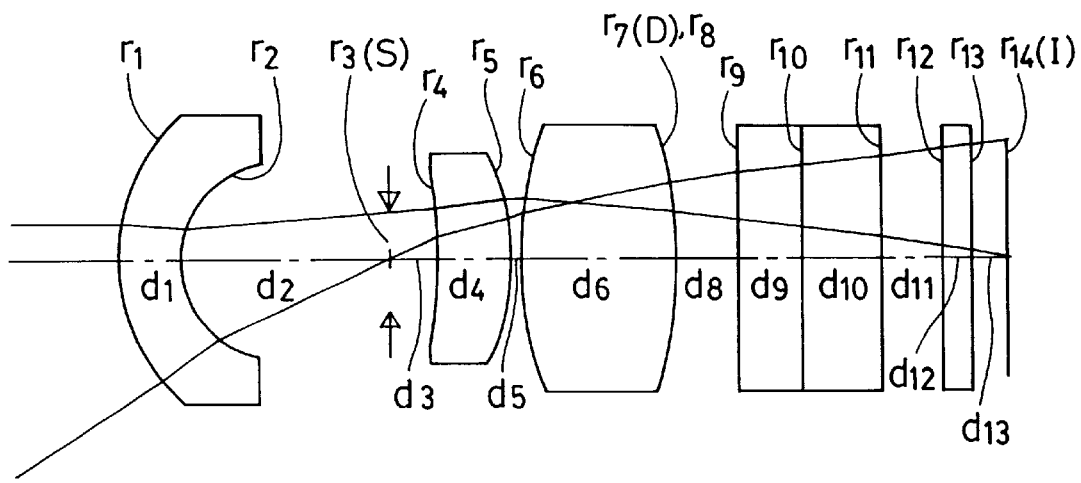
FIG. 8 is a schematic illustrating a section and optical path of Example 12 of the phototaking lens system according to the present invention, as taken along an optical axis thereof.
Figure 9:
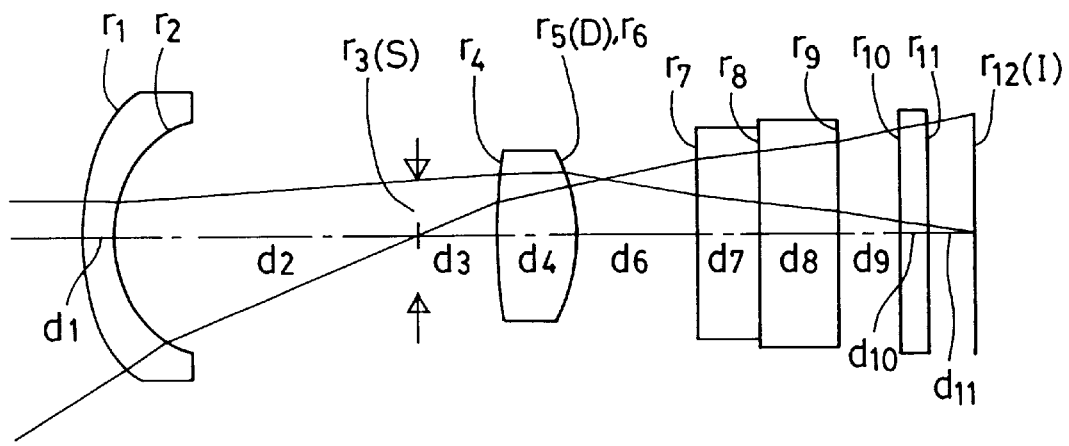
FIG. 9 is a schematic illustrating a section and optical path of Example 14 of the phototaking lens system according to the present invention, as taken along an optical axis thereof.
Figure 10:
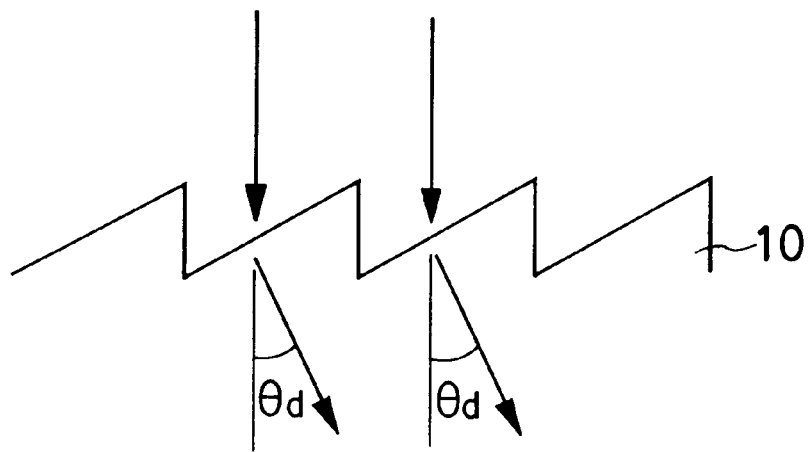
FIG. 10 is a schematic illustrative of how a light bundle is vertically incident on a diffractive surface of a diffractive optical element.
Figure 11:
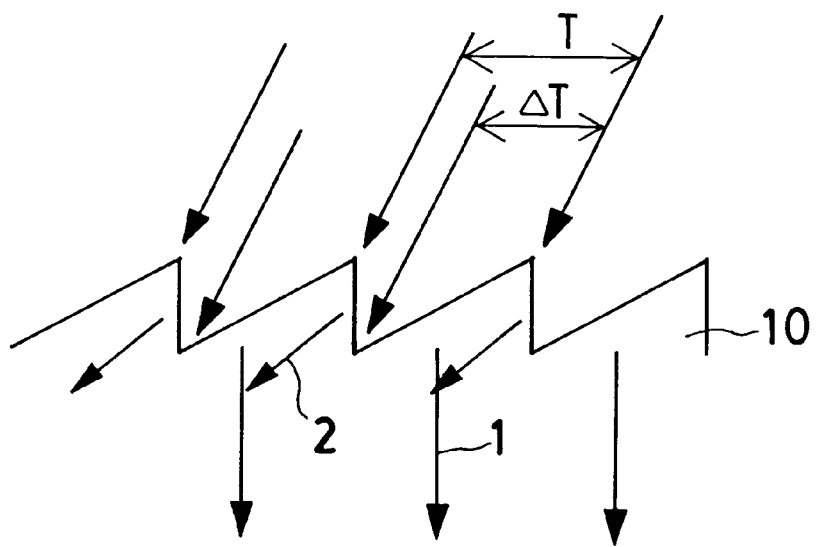
FIG. 11 is a schematic illustrative of how a light bundle is obliquely incident on a diffractive surface of a diffractive optical element.

It is noted that Examples 3 and 4 are not illustrated because their arrangements are the same as shown in FIG. 2, Examples 9 and 11 are not illustrated because their arrangements are the same as shown in FIG. 7, Example 13 is not illustrated because its arrangement is the same as shown in FIG. 8, and Examples 15 and 16 are not illustrated because their arrangements are the same as shown in FIG. 9.

In Examples 1 to 8 diffractive surfaces are provided on plane surfaces, and in Examples 9 to 16 diffractive surfaces are provided on surfaces having a given curvature.

Examples 1 to 5 are each composed of a front group consisting of one lens having negative power and a rear group consisting of one refractive lens having positive power and one diffractive optical element, with an aperture stop located between both the groups, three components in all. Albeit being composed of an extremely reduced number of lenses, these examples are satisfactorily corrected for off-axis aberrations as well as for longitudinal chromatic aberration and chromatic aberration of magnification.

Figure 1:
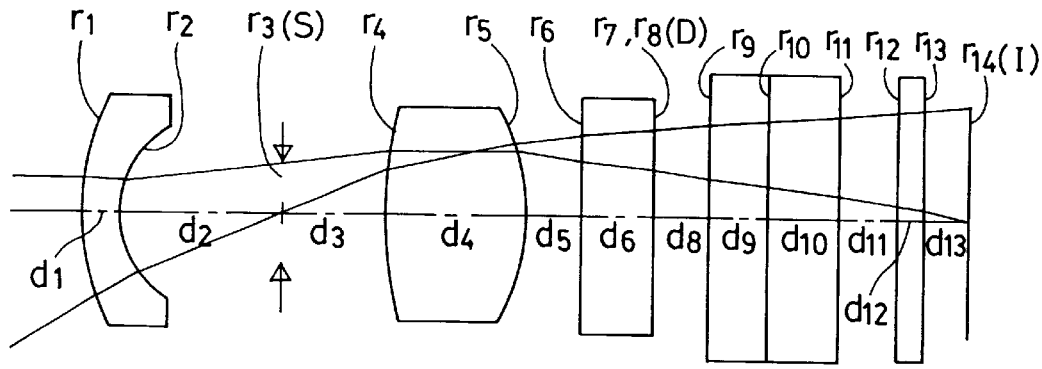
FIG. 1 is a schematic illustrating a section and optical path of Example 1 of the phototaking lens system according to the present invention, as taken along an optical axis thereof.

In Example 1, the front group consists of one negative meniscus lens that is convex on the object side and the rear group consists of a double-convex lens and a diffractive optical element in which a diffractive surface is provided on a surface of a plane-parallel plate that is opposite to the image side, as can be seen from FIG. 1. As indicated by numerical data to be given later, three aspheric surfaces are used, one for the object-side surface of the negative meniscus lens, one for the image-side surface of the double-convex lens, and one for the diffractive surface. Two refractive lenses are formed of the same vitreous material. Although considerably large chromatic aberration is produced at the refractive lens system, yet this chromatic aberration is well corrected by locating the diffractive surface at as high a position of off-axis chief rays as possible, i.e., at a position as farther away from the aperture stop as possible. For this reason, the diffractive surface is provided on the image-side surface of the diffractive optical element. In addition, aspheric effect is imparted to the diffractive surface so that off-axis aberrations produced at the negative and positive lenses, especially coma and astigmatism can be well corrected.

In Example 2, the front group consists of one negative meniscus lens that is convex on the object side and the rear group consists of a double-convex lens and a diffractive optical element in which a diffractive surface is provided on a surface of a plane-parallel plate that is opposite to the object side, as can be seen from FIG. 2. As indicated by numerical data to be given later, three aspheric surfaces are used, one for the image-side surface of the negative meniscus lens, one for the image-side surface of the double-convex lens, and one for the diffractive surface. The refractive optical system and diffractive optical element are all designed with the same plastic material. In this example, too, longitudinal chromatic aberration and chromatic aberration of magnification are well corrected and the image-forming capability of peripheral areas of the field angle is improved. In addition, considerable cost reductions are achieved by constructing all the optical elements of plastic material.

In Example 3, the front group consists of one negative meniscus lens that is convex on the object side and the rear group consists of a double-convex lens and a diffractive optical element in which a diffractive surface is provided on a surface of a plane-parallel plate that is opposite to the object side. As indicated by numerical data to be given later, three aspheric surfaces are used, one for the object-side surface of the negative meniscus lens, one for the image-side surface of the double-convex lens, and one for the diffractive surface. An optical glass of low dispersion is used for the negative lens in the front group, and an optical glass of high dispersion is used for the refractive lens in the rear group. To make correction for longitudinal chromatic aberration, it is a general technique to use a high-dispersion glass for the negative lens in the front group and a low-dispersion glass for the positive lens in the rear group. According to the present invention, however, even when glasses are inverted in terms of Abbe number, the longitudinal chromatic aberration can be sufficiently corrected because of the anomalous dispersion of the diffractive surface. In particular, the longitudinal chromatic aberration is well corrected by locating the diffractive surface at as high a position of axial marginal rays as possible, i.e., at a position close to the aperture stop. It is thus possible to make the overall length of the rear group short, and consequently make the overall length of the phototaking lens system short. The anomalous dispersion feature of the diffractive surface enables the chromatic aberration of magnification to be well corrected even when the diffractive surface is located at a low position of an off-axis bundle. In addition, the diffractive surface, because of having an aspheric effect, can completely eliminate higher-order chromatic aberrations of magnification, so that good image-forming capability can be obtained even at peripheral areas of the field angle.

In Example 4, the front group consists of one negative meniscus lens that is convex on the object side and the rear group consists of a double-convex lens and a diffractive optical element in which a diffractive surface is provided on a surface of a plane-parallel plate that is opposite to the object side. As indicated by numerical data to be given later, three aspheric surfaces are used, one for the object-side surface of the negative meniscus lens, one for the image-side surface of the double-convex lens, and one for the diffractive surface. An optical glass of high dispersion is used for the negative lens in the front group, and an optical glass of low dispersion is used for the refractive lens in the rear group. In this case, it is possible to reduce longitudinal chromatic aberration by as much as possible at the refractive lens system, but considerably large negative chromatic aberration of magnification is produced. However, this chromatic aberration of magnification can be well corrected by locating the diffractive surface at as high a position of off-axis chief rays as possible, i.e., at a position between the aperture stop and the image side, just as in the case of Example 1. In this example, too, it is thus possible to make good correction for aberrations even at peripheral areas of the field angle.

Figure 3:
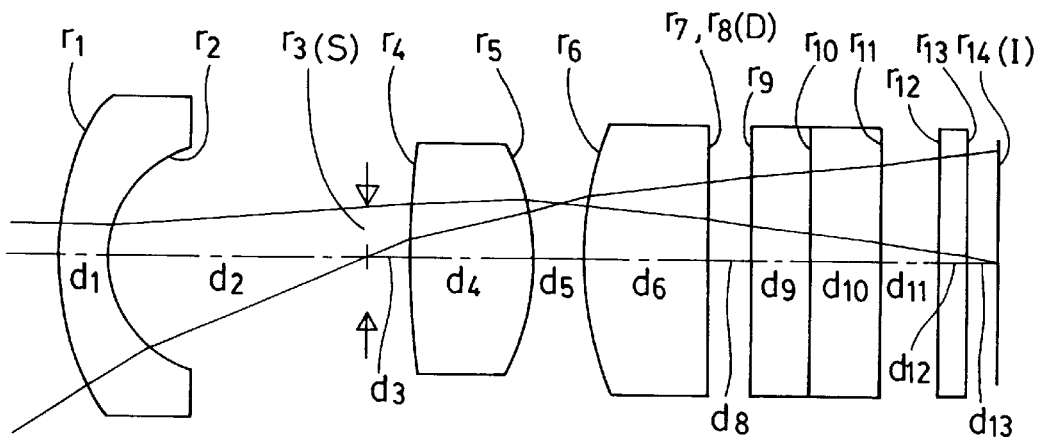
FIG. 3 is a schematic illustrating a section and optical path of Example 5 of the phototaking lens system according to the present invention, as taken along an optical axis thereof.

In Example 5, the front group consists of one negative meniscus lens that is convex on the object side and the rear group consists of a double-convex lens and a diffractive optical element in which a diffractive surface is provided on a surface of a plano-convex lens that is opposite to the image side, as can be seen from FIG. 3. As indicated by numerical data to be given later, three aspheric surfaces are used, one for the object-side surface of the negative meniscus lens, one for the image-side surface of the double-convex lens, and one for the diffractive surface. In this example, curvature is imparted to a surface of the diffractive optical element that has no diffractive surface. This example is more preferable because the powers of individual surfaces of the refractive lens in the rear group can be made so weak that off-axis aberrations produced at the individual surfaces can be minimized to make good correction for various aberrations.

Figure 4:
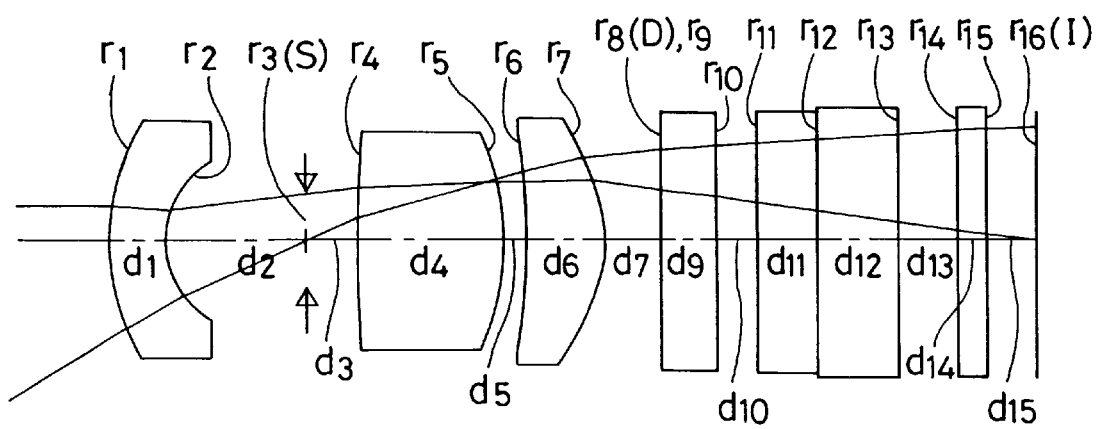
FIG. 4 is a schematic illustrating a section and optical path of Example 6 of the phototaking lens system according to the present invention, as taken along an optical axis thereof.

In Example 6, the front group consists of one negative meniscus lens that is convex on the object side and the rear group consists of a double-convex lens, a positive meniscus lens that is convex on the image side and a diffractive optical element in which a diffractive surface is provided on a surface of a plane-parallel plate that is opposite to the object side, as shown in FIG. 4. As indicated by numerical data to be given later, four aspheric surfaces are used, one for the object-side surface of the negative meniscus lens, one for the image-side surface of the double-convex lens, one for the image-side surface of the positive meniscus lens, and one for the diffractive surface. This example is preferable because off-axis aberrations are better corrected by constructing the refractive lens in the rear group of two lens components, and the overall length of the phototaking lens system can be made short as well.

Examples 7 and 8 are each composed of a front group consisting of two lenses, viz., one refractive lens of positive power and one refractive lens of negative power and a rear group consisting of one refractive lens and one diffractive optical element with an aperture stop located between both the groups, four components in all. In these examples, too, off-axis aberrations are well corrected with a very reduced number of lenses, and longitudinal chromatic aberration and chromatic aberration of magnification are sufficiently corrected as well.

Figure 5:
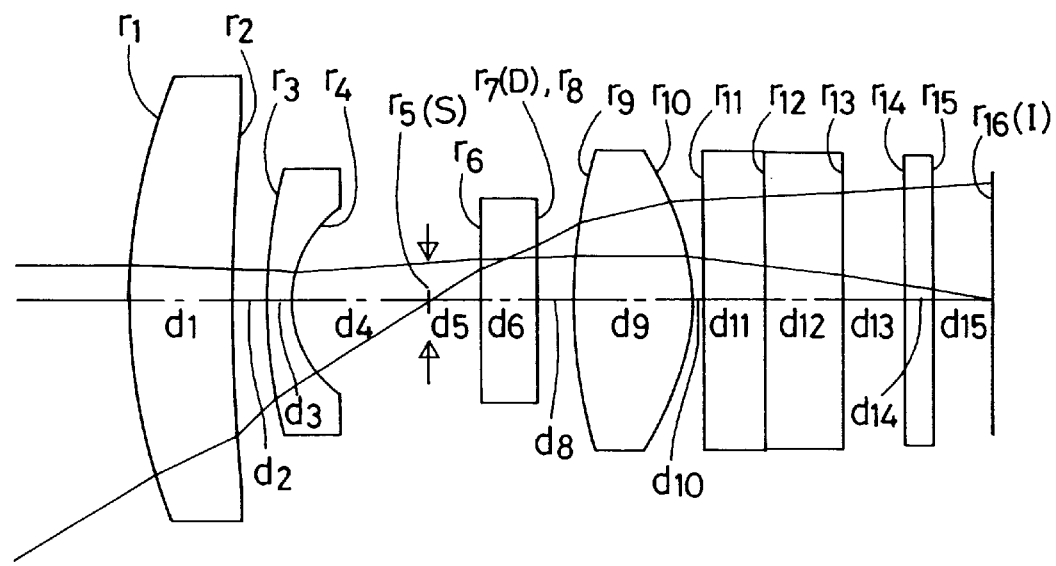
FIG. 5 is a schematic illustrating a section and optical path of Example 7 of the phototaking lens system according to the present invention, as taken along an optical axis thereof.

In Example 7, the front group consists of two lenses, viz., a positive meniscus lens that is convex on the object side and a negative meniscus lens that is convex on the object side and the rear group consists of a diffractive optical element comprising a plane-parallel plate and a diffractive surface provided on a surface thereof opposite to the image side and a double-convex lens, as can be seen from FIG. 5. As indicated by numerical data to be given later, two aspheric surfaces are used, one for the diffractive surface and another for the image-side surface of the double-convex lens. Since, according to this example, the front group consists of the positive lens of high dispersion and the negative lens of low dispersion, chromatic aberration of magnification is reduced as much as possible at the front group while longitudinal chromatic aberration is well corrected by locating the diffractive surface at a position close to the aperture stop. Just as in the case of Example 3, it is possible to make the phototaking lens system compact and obtain good image-forming capability even at peripheral areas of the field angle. In this example, it is preferable to give curvature to a side of the diffractive optical element having no diffractive surface because aberrations can be better corrected.

Figure 6:
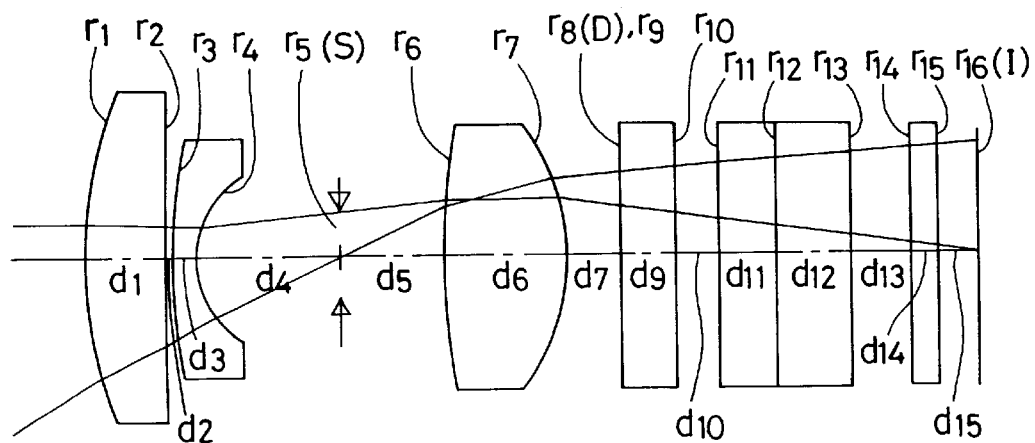
FIG. 6 is a schematic illustrating a section and optical path of Example 8 of the phototaking lens system according to the present invention, as taken along an optical axis thereof.

In Example 8, the front group consists of two lenses, viz., a positive meniscus lens that is convex on the object side and a negative meniscus lens that is convex on the object side and the rear group consists of a double-convex lens and a diffractive optical element comprising a plane-parallel plate and a diffractive surface provided on a surface thereof opposite to the object side, as depicted in FIG. 6. As indicated by numerical data to be given later, three aspheric surfaces are used, one for the object-side surface of the positive meniscus lens, one for the image-side surface of the double-convex lens, and one for the diffractive surface. In this example, the front group and diffractive optical element are all formed of the same plastic material. In this example, too, aberrations are well corrected even at peripheral areas of the field angle, and some considerable cost reductions are achieved as well.

Examples 9 to 16 are each composed of a front group consisting of one lens of negative power and a rear group comprising a diffractive optical element in which a diffractive surface of positive power is defined by one surface having a given curvature, with an aperture stop located between both the groups. Since, in these examples, the diffractive surface is defined by the surface having a given curvature, an off-axis bundle and axial marginal rays are incident on the diffractive surface at substantially vertical angles, so that the number of lenses can be reduced while the diffraction efficiency drop can be reduced as much as possible.

In Example 9, the front group consists of one negative meniscus lens that is convex on the object side and the rear group consists of a double-convex lens and a diffractive optical element comprising a double-convex lens and a diffractive surface provided on a surface thereof opposite to the image side. As indicated by numerical data to be given later, three aspheric surfaces are used, one for the object-side surface of the negative meniscus lens, one for the image-side surface of the double-convex lens located on the object side, and one for the diffractive surface. The phototaking lens system according to this example is well corrected for off-axis aberrations and chromatic aberrations albeit being composed of a very reduced number of lenses, i.e., three lenses. In addition, this phototaking lens system can be fabricated at very low costs due to its short overall length.

In Example 10, the front group consists of one negative meniscus lens that is convex on the object side and the rear group consists of a double-convex lens and a diffractive optical element comprising a double-convex lens and a diffractive surface provided on a surface thereof opposite to the image side, as depicted in FIG. 7. As indicated by numerical data to be given later, three aspheric surfaces are used, one for the object-side surface of the negative meniscus lens, one for the image-side surface of the double-convex lens located on the object side, and one for the diffractive surface. The phototaking lens system according to this example is well corrected for off-axis aberrations and chromatic aberrations albeit being composed of a very reduced number of lenses, i.e., three lenses. In addition, this phototaking lens system can be fabricated at very low costs due to its short overall length.

In Example 11, the front group consists of one negative meniscus lens that is convex on the object side and the rear group consists of a double-convex lens and a diffractive optical element comprising a double-convex lens and a diffractive surface provided on a surface thereof opposite to the image side. As indicated by numerical data to be given later, two aspheric surfaces are used, one for the object-side surface of the negative meniscus lens and another for the diffractive surface. The phototaking lens system according to this example is well corrected for off-axis aberrations and chromatic aberrations albeit being composed of a very reduced number of lenses, i.e., three lenses. In addition, this phototaking lens system can be fabricated at very low costs due to its short overall length.

In Example 12, the front group consists of one negative meniscus lens that is convex on the object side and the rear group consists of a positive meniscus lens that is convex on the object side and a diffractive optical element comprising a double-convex lens and a diffractive surface provided on a surface thereof opposite to the image side, as depicted in FIG. 8. As indicated by numerical data to be given later, two aspheric surfaces are used, one for the object-side surface of the negative meniscus lens and another for the diffractive surface. The phototaking lens system according to this example is well corrected for off-axis aberrations and chromatic aberrations albeit being composed of a very reduced number of lenses, i.e., three lenses. In addition, this phototaking lens system can be fabricated at very low costs due to its short overall length.

In Example 13, the front group consists of one negative meniscus lens that is convex on the object side and the rear group consists of a positive meniscus lens that is convex on the object side and a diffractive optical element comprising a double-convex lens and a diffractive surface provided on a surface thereof opposite to the image side. As indicated by numerical data to be given later, two aspheric surfaces are used, one for the object-side surface of the negative meniscus lens and another for the diffractive surface. The phototaking lens system according to this example is well corrected for off-axis aberrations and chromatic aberrations albeit being composed of a very reduced number of lenses, i.e., three lenses. In addition, this phototaking lens system can be fabricated at very low costs due to its short overall length.

In Example 14, the front group consists of one negative meniscus lens that is convex on the object side and the rear group consists of one diffractive optical element comprising a double-convex lens and a diffractive surface provided on a surface thereof opposite to the image side, as shown in FIG. 9. As indicated by numerical data to be given later, four aspheric surfaces are used, two for both surfaces of the negative meniscus lens, one for the object-side surface of the double-convex lens (diffractive optical element), and one for the diffractive surface. The phototaking lens system according to this example is well corrected for off-axis aberrations and chromatic aberrations albeit being composed of a very reduced number of lenses, i.e., two lenses. In addition, this phototaking lens system can be fabricated at very low costs due to its short overall length.

In Example 15, the front group consists of one negative meniscus lens that is convex on the object side and the rear group consists of one diffractive optical element comprising a double-convex lens and a diffractive surface provided on a surface thereof opposite to the image side. As indicated by numerical data to be given later, three aspheric surfaces are used, one for the object-side surface of the negative meniscus lens, one for the object-side surface of the double-convex lens (diffractive optical element), and one for the diffractive surface. The phototaking lens system according to this example is well corrected for off-axis aberrations and chromatic aberrations albeit being composed of a very reduced number of lenses, i.e., two lenses. In addition, this phototaking lens system can be fabricated at very low costs due to its short overall length.

In Example 16, the front group consists of one negative meniscus lens that is convex on the object side and the rear group consists of one diffractive optical element comprising a double-convex lens and a diffractive surface provided on a surface thereof opposite to the image side. As indicated by numerical data to be given later, three aspheric surfaces are used, one for the object-side surface of the negative meniscus lens, one for the object-side surface of the double-convex lens (diffractive optical element), and one for the diffractive surface. The phototaking lens system according to this example is well corrected for off-axis aberrations and chromatic aberrations albeit being composed of a very reduced number of lenses, i.e., two lenses. In addition, this phototaking lens system can be fabricated at very low costs due to its short overall length.

Enumerated below are numerical data on Examples 1 to 16. Symbols used hereinafter but not hereinbefore have the following meanings.

$F_{NO}$ is F-number, $r_1, r_2, \ldots$ are radii of curvature of lens surfaces, $d_1, d_2, \ldots$ are spacings between adjacent lens surfaces, $n_{d1}, n_{d2}, \ldots$ are d-line refractive indices of lenses, and $v_{d1}, v_{d2}, \ldots$ are d-line Abbe number.

The aspheric shape is represented by the aforesaid equation (a).

Example 1

$r_1 = 7.7397$(Aspheric)   $d_1 = 1.0961$   $n_{d1} = 1.53996$   $v_{d1} = 59.45$
$r_2 = 2.6947$   $d_2 = 4.4445$
$r_3 = $ (Stop)   $d_3 = 2.8391$
$r_4 = 11.1510$   $d_4 = 4.0008$   $n_{d2} = 1.53996$   $v_{d2} = 59.45$
$r_5 = -4.9152$(Aspheric)   $d_5 = 1.4514$
$r_6 = \infty$   $d_6 = 2.0000$   $n_{d3} = 1.45851$   $v_{d3} = 66.75$
$r_7 = \infty$   $d_7 = 0$   $n_{d4} = 1000$   $v_{d4} = -3.45$
$r_8 = -7.780 \times 10^4$   $d_8 = 1.4877$
(Aspheric)
$r_9 = \infty$   $d_9 = 1.6000$   $n_{d5} = 1.51633$   $v_{d5} = 64.15$
$r_{10} = \infty$   $d_{10} = 2.0200$   $n_{d6} = 1.51633$   $v_{d6} = 64.15$
$r_{11} = \infty$   $d_{11} = 1.6000$
$r_{12} = \infty$   $d_{12} = 0.7500$   $n_{d7} = 1.48749$   $v_{d7} = 70.21$
$r_{13} = \infty$   $d_{13} = 1.2098$
$r_{14} = \infty$ (Image plane)

Aspherical Coefficients

1st surface $K = 0$
$A_4 = 1.1852 \times 10^{-3}$
$A_6 = -2.0846 \times 10^{-5}$
$A_8 = 4.6474 \times 10^{-6}$
$A_{10} = -9.2890 \times 10^{-8}$ 5th surface $K = 0$
$A_4 = 1.9697 \times 10^{-3}$
$A_6 = 1.4761 \times 10^{-6}$
$A_8 = 3.3153 \times 10^{-7}$
$A_{10} = 6.0026 \times 10^{-8}$ 8th surface $K = -1.0000$
$A_4 = -3.2821 \times 10^{-7}$
$A_6 = 2.8060 \times 10^{-8}$
$A_8 = 0$
$A_{10} = 0$ $f = 5.0984$   $F_{NO} = 2.8$
$\phi_{DOE}/\phi = 0.06553$   $D_{DOE}/f = 2.01854$
$\phi_{REF}/\phi = 0.73650$   $EXP_{DOE}/f = 5.038$
$f/f_F = -0.61517$   $D_{FS}/f = 1.08673$
$R_{12}/D_{2S} = 0.60631$   $(R_1 + R_2)/(R_1 - R_2) = 0.38813$
$D_{SL}/f = 2.01854$   $(R_a + R_b)/(R_a - R_b) = 2.06829$

Example 2

$r_1 = 6.1271$   $d_1 = 0.8000$   $n_{d1} = 1.49241$   $v_{d1} = 57.66$
$r_2 = 2.1845$(Aspheric)   $d_2 = 3.6480$
$r_3 = \infty$ (Stop)   $d_3 = 2.4758$
$r_4 = 10.7443$   $d_4 = 3.5202$   $n_{d2} = 1.49241$   $v_{d2} = 57.66$
$r_5 = -4.0459$(Aspheric)   $d_5 = 2.1375$
$r_6 = 7.959 \times 10^4$   $d_6 = 0$   $n_{d3} = 1000$   $v_{d3} = -3.45$
(Aspheric)
$r_7 = \infty$   $d_7 = 1.5000$   $n_{d4} = 1.49241$   $v_{d4} = 57.66$
$r_8 = \infty$   $d_8 = 1.0000$
$r_9 = \infty$   $d_9 = 1.6000$   $n_{d5} = 1.51633$   $v_{d5} = 64.15$
$r_{10} = \infty$   $d_{10} = 2.0200$   $n_{d6} = 1.51633$   $v_{d6} = 64.15$
$r_{11} = \infty$   $d_{11} = 1.6000$
$r_{12} = \infty$   $d_{12} = 0.7500$   $n_{d7} = 1.48749$   $v_{d7} = 70.21$
$r_{13} = \infty$   $d_{13} = 1.2095$
$r_{14} \infty$ (Image plane)

Aspherical Coefficients

2nd surface $K = 0$
$A_4 = -1.4442 \times 10^{-3}$
$A_6 = -2.6631 \times 10^{-3}$
$A_8 = 8.8923 \times 10^{-4}$
$A_{10} = -2.0382 \times 10^{-4}$ 5th surface $K = 0$
$A_4 = 2.7192 \times 10^{-3}$ -continued $A_6 = 9.7868 \times 10^{-5}$
$A_8 = -6.2799 \times 10^{-6}$
$A_{10} = 6.2732 \times 10^{-7}$ 6th surface $K = 0$
$A_4 = 3.9604 \times 10^{-7}$
$A_6 = -2.7532 \times 10^{-8}$
$A_8 = 0$
$A_{10} = 0$

| $f = 5.0404$ | $F_{NO} = 2.8$ |
|---|---|
| $\phi_{DOE}/\phi = 0.06333$ | $D_{DOE}/f = 1.18958$ |
| $\phi_{REF}/\phi = 0.77813$ | $EXP_{DOE}/f = 5.959$ |
| $f/f_F = 0.68215$ | $D_{FS}/f = 0.88246$ |
| $R_{12}/D_{2S} = 0.59882$ | $(R_1 + R_2)/(R_1 - R_2) = 0.45289$ |
| $D_{SL}/f = 1.91125$ | $(R_a + R_b)/(R_a - R_b) = 2.10814$ |

Example 3

| $r_1 = 6.6382$(Aspheric) | $d_1 = 0.8404$ | $n_{d1} = 1.51633$ | $\nu_{d1} = 64.15$ |
|---|---|---|---|
| $r_2 = 3.3423$ | $d_2 = 8.4844$ | | |
| $r_3 = \infty$ (Stop) | $d_3 = 1.3659$ | | |
| $r_4 = 17.8782$ | $d_4 = 4.0742$ | $n_{d2} = 1.76182$ | $\nu_{d2} = 26.52$ |
| $r_5 = -7.8959$(Aspheric) | $d_5 = 1.0026$ | | |
| $r_6 = 4.068 \times 10^4$ (Aspheric) | $d_6 = 0$ | $n_{d3} = 1000$ | $\nu_{d3} = -3.45$ |
| $r_7 = \infty$ | $d_7 = 2.0000$ | $n_{d4} = 1.52542$ | $\nu_{d4} = 55.78$ |
| $r_8 = \infty$ | $d_8 = 1.0800$ | | |
| $r_9 = \infty$ | $d_9 = 1.6000$ | $n_{d5} = 1.51633$ | $\nu_{d5} = 64.15$ |
| $r_{10} = \infty$ | $d_{10} = 2.0200$ | $n_{d6} = 1.51633$ | $\nu_{d6} = 64.15$ |
| $r_{11} = \infty$ | $d_{11} = 1.6000$ | | |
| $r_{12} = \infty$ | $d_{12} = 0.7500$ | $n_{d7} = 1.48749$ | $\nu_{d7} = 70.21$ |
| $r_{13} = \infty$ | $d_{13} = 0.7220$ | | |
| $r_{14} = \infty$ (Image plane) | | | |

Aspherical Coefficients

1st surface $K = 0$
$A_4 = 5.1003 \times 10^{-4}$
$A_6 = 2.0208 \times 10^{-5}$
$A_8 = -4.4085 \times 10^{-7}$
$A_{10} = 8.0261 \times 10^{-8}$ 5th surface $K = 0$
$A_4 = 5.9674 \times 10^{-4}$
$A_6 = -2.4189 \times 10^{-5}$
$A_8 = -3.0128 \times 10^{-6}$
$A_{10} = 1.6469 \times 10^{-7}$ 6th surface $K = 0$
$A_4 = 8.0194 \times 10^{-8}$
$A_6 = -3.6732 \times 10^{-8}$
$A_8 = 0$
$A_{10} = 0$

| $f = 5.11384$ | $F_{NO} = 2.84$ |
|---|---|
| $\phi_{DOE}/\phi = 0.12583$ | $D_{DOE}/f = 1.25986$ |
| $\phi_{REF}/\phi = 0.66292$ | $EXP_{DOE}/f = 2.594$ |
| $f/f_F = -0.35817$ | $D_{FS}/f = 1.82346$ |
| $R_{12}/D_{2S} = 0.39394$ | $(R_1 + R_2)/(R_1 - R_2) = 0.38730$ |
| $D_{SL}/f = 1.65095$ | $(R_a + R_b)/(R_a - R_b) = 3.02820$ |

Example 4

| $r_1 = 8.1510$(Aspheric) | $d_1 = 1.4179$ | $n_{d1} = 1.55690$ | $\nu_{d1} = 48.55$ |
|---|---|---|---|
| $r_2 = 2.9678$ | $d_2 = 6.5062$ | | |
| $r_3 = \infty$ (Stop) | $d_3 = 3.2618$ | | |
| $r_4 = 9.8660$ | $d_4 = 4.0828$ | $n_{d2} = 1.51633$ | $\nu_{d2} = 64.15$ |
| $r_5 = 5.5846$(Aspheric) | $d_5 = 2.2915$ | | |
| $r_6 = 9.121 \times 10^4$ (Aspheric) | $d_6 = 0$ | $n_{d3} = 1000$ | $\nu_{d3} = -3.45$ |
| $r_7 = \infty$ | $d_7 = 2.0000$ | $n_{d4} = 1.52542$ | $\nu_{d4} = 55.78$ |
| $r_8 = \infty$ | $d_8 = 1.0000$ | | |
| $r_9 = \infty$ | $d_9 = 1.6000$ | $n_{d5} = 1.51633$ | $\nu_{d5} = 64.15$ |
| $r_{10} = \infty$ | $d_{10} = 2.0200$ | $n_{d6} = 1.51633$ | $\nu_{d6} = 64.15$ |

-continued

| $r_{11} = \infty$ | $d_{11} = 1.6000$ | | |
|---|---|---|---|
| $r_{12} = \infty$ | $d_{12} = 0.7500$ | $n_{d7} = 1.48749$ | $\nu_{d7} = 70.21$ |
| $r_{13} = \infty$ | $d_{13} = 1.1694$ | | |
| $r_{14} = \infty$ (Image plane) | | | |

Aspherical Coefficients

1st surface $K = 0$
$A_4 = 7.7876 \times 10^{-4}$
$A_6 = 2.4553 \times 10^{-5}$
$A_8 = -9.2259 \times 10^7$
$A_{10} = 7.2604 \times 10^{-8}$ 5th surface $K = 0$
$A_4 = 1.8902 \times 10^{-3}$
$A_6 = -4.3467 \times 10^{-6}$
$A_8 = -1.4919 \times 10^{-6}$
$A_{10} = 8.8576 \times 10^{-8}$ 6th surface $K = 0$
$A_4 = 4.2564 \times 10^{-7}$
$A_6 = -3.1464 \times 10^{-8}$
$A_8 = 0$
$A_{10} = 0$

| $f = 5.0346$ | $F_{NO} = 2.8$ |
|---|---|
| $\phi_{DOE}/\phi = 0.05520$ | $D_{DOE}/f = 1.91400$ |
| $\phi_{REF}/\phi = 0.66337$ | $EXP_{DOE}/f = 7.712$ |
| $f/f_F = -0.54197$ | $D_{FS}/f = 1.57393$ |
| $R_{12}/D_{2S} = 0.45615$ | $(R_1 + R_2)/(R_1 - R_2) = 0.27710$ |
| $D_{SL}/f = 2.31125$ | $(R_a + R_b)/(R_a - R_b) = 2.14516$ |

Example 5

| $r_1 = 8.5281$(Aspheric) | $d_1 = 1.4618$ | $n_{d1} = 1.49241$ | $\nu_{d1} = 57.66$ |
|---|---|---|---|
| $r_2 = 3.1543$ | $d_2 = 7.0181$ | | |
| $r_3 = \infty$ (Stop) | $d_3 = 1.2414$ | | |
| $r_4 = 22.9365$ | $d_4 = 3.4949$ | $n_{d2} = 1.49241$ | $\nu_{d2} = 57.66$ |
| $r_5 = -5.8210$(Aspheric) | $d_5 = 1.3572$ | | |
| $r_6 = 10.4847$ | $d_6 = 3.3788$ | $n_{d3} = 1.49241$ | $\nu_{d3} = 57.66$ |
| $r_7 = \infty$ | $d_7 = 0$ | $n_{d4} = 1000$ | $\nu_{d4} = -3.45$ |
| $r_8 = -6.559 \times 10^4$ (Aspheric) | $d_8 = 1.1393$ | | |
| $r_9 = \infty$ | $d_9 = 1.6000$ | $n_{d5} = 1.51633$ | $\nu_{d5} = 64.15$ |
| $r_{10} = \infty$ | $d_{10} = 2.0200$ | $n_{d6} = 1.51633$ | $\nu_{d6} = 64.15$ |
| $r_{11} = \infty$ | $d_{11} = 1.6000$ | | |
| $r_{12} = \infty$ | $d_{12} = 0.7500$ | $n_{d7} = 1.48749$ | $\nu_{d7} = 70.21$ |
| $r_{13} = \infty$ | $d_{13} = 0.7991$ | | |
| $r_{14} = \infty$ (Image plane) | | | |

Aspherical Coefficients

1st surface $K = 0$
$A_4 = 4.2526 \times 10^{-4}$
$A_6 = 1.6151 \times 10^{-5}$
$A_8 = 5.0518 \times 10^{-7}$
$A_{10} = 2.5832 \times 10^{-8}$ 5th surface $K = 0$
$A_4 = 7.7318 \times 10^{-4}$
$A_6 = -7.6264 \times 10^{-7}$
$A_8 = -4.8296 \times 10^{-6}$
$A_{10} = 4.8540 \times 10^{-7}$ 8th surface $K = 0$
$A_4 = -4.8301 \times 10^{-8}$
$A_6 = 9.6326 \times 10^{-9}$
$A_8 = 0$
$A_{10} = 0$

| $f = 5.0641$ | $F_{NO} = 2.8$ |
|---|---|
| $\phi_{DOE}/\phi = 0.07721$ | $D_{DOE}/f = 1.87050$ |

-continued

| | |
|---|---|
| $\phi_{REF}/\phi = 0.70857$ | $EXP_{DOE}/f = 3.166$ |
| $f/f_F = -0.45343$ | $D_{FS}/f = 1.67452$ |
| $R_{12}/D_{2S} = 0.44945$ | $(R_1 + R_2)/(R_1 - R_2) = 0.59517$ |
| $D_{SL}/f = 1.87050$ | $(R_a + R_b)/(R_a - R_b) = 2.17397$ |

Example 6

| | | | |
|---|---|---|---|
| $r_1 = 6.8304$(Aspheric) | $d_1 = 1.4347$ | $n_{d1} = 1.49241$ | $\nu_{d1} = 57.66$ |
| $r_2 = 2.2988$ | $d_2 = 3.5779$ | | |
| $r_3 = \infty$ (Stop) | $d_3 = 1.4072$ | | |
| $r_4 = 35.3085$ | $d_4 = 3.8067$ | $n_{d2} = 1.49241$ | $\nu_{d2} = 57.66$ |
| $r_5 = -6.8005$(Aspheric) | $d_5 = 0.5419$ | | |
| $r_6 = -21.1276$ | $d_6 = 2.0264$ | $n_{d3} = 1.49241$ | $\nu_{d3} = 57.66$ |
| $r_7 = -4.5055$(Aspheric) | $d_7 = 1.4642$ | | |
| $r_8 = 9.054 \times 10^4$ (Aspheric) | $d_8 = 0$ | $n_{d4} = 1000$ | $\nu_{d4} = -3.45$ |
| $r_9 = \infty$ | $d_9 = 1.5000$ | $n_{d5} = 1.49241$ | $\nu_{d5} = 57.66$ |
| $r_{10} = \infty$ | $d_{10} = 1.0000$ | | |
| $r_{11} = \infty$ | $d_{11} = 1.6000$ | $n_{d6} = 1.51633$ | $\nu_{d6} = 64.15$ |
| $r_{12} = \infty$ | $d_{12} = 2.0200$ | $n_{d7} = 1.51633$ | $\nu_{d7} = 64.15$ |
| $r_{13} = \infty$ | $d_{13} = 1.6000$ | | |
| $r_{14} = \infty$ | $d_{14} = 0.7500$ | $n_d = 1.48749$ | $\nu d = 70.21$ |
| $r_{15} = \infty$ | $d_{15} = 1.2114$ | | |
| $r_{16} = \infty$ (Image plane) | | | |

Aspherical Coefficients

1st surface $K = 0$
$A_4 = 1.5537 \times 10^{-3}$
$A_6 = 6.8786 \times 10^{-5}$
$A_8 = 6.9016 \times 10^{-6}$
$A_{10} = 5.9371 \times 10^{-7}$ 5th surface $K = 0$
$A_4 = 1.0503 \times 10^{-3}$
$A_6 = 4.5383 \times 10^{-5}$
$A_8 = 5.5161 \times 10^{-6}$
$A_{10} = 1.7449 \times 10^{-7}$ 7th surface $K = 0$
$A_4 = 1.5267 \times 10^{-3}$
$A_6 = 3.8840 \times 10^{-5}$
$A_8 = 2.6791 \times 10^{-6}$
$A_{10} = 1.9990 \times 10^{-7}$ 8th surface $K = 0$
$A_4 = 3.0739 \times 10^{-7}$
$A_6 = 1.7796 \times 10^{-8}$
$A_8 = 0$
$A_{10} = 0$

| | |
|---|---|
| $f = 4.9181$ | $F_{NO} = 2.8$ |
| $\phi_{DOE}/\phi = 0.05432$ | $D_{DOE}/f = 1.88009$ |
| $\phi_{REF}/\phi = 0.75516$ | $EXP_{DOE}/f = 9.842$ |
| $f/f_F = -0.62590$ | $D_{FS}/f = 1.01922$ |
| $R_{12}/D_{2S} = 0.64251$ | $(R_1 + R_2)/(R_1 - R_2) = 0.67701$ |
| | $1.54211$ |
| $D_{SL}/f = 2.18509$ | $(R_a + R_b)/(R_a - R_b) = 2.01458$ |

Example 7

| | | | |
|---|---|---|---|
| $r_1 = 15.1841$ | $d_1 = 2.6305$ | $n_{d1} = 1.84666$ | $\nu_{d1} = 23.78$ |
| $r_2 = 47.3824$ | $d_2 = 0.8494$ | | |
| $r_3 = 12.2804$ | $d_3 = 0.7131$ | $n_{d2} = 1.48749$ | $\nu_{d2} = 70.21$ |
| $r_4 = 2.9021$ | $d_4 = 3.4903$ | | |
| $r_5 = \infty$ (Stop) | $d_5 = 1.4054$ | | |
| $r_6 = \infty$ | $d_6 = 1.5000$ | $n_{d3} = 1.45851$ | $\nu_{d3} = 66.75$ |
| $r_7 = 4.072 \times 10^4$ (Aspheric) | $d_7 = 0$ | $n_{d4} = 1000$ | $\nu_{d4} = -3.45$ |
| $r_8 = \infty$ | $d_8 = 0.9958$ | | |
| $r_9 = 16.1274$ | $d_9 = 3.0000$ | $n_{d5} = 1.76200$ | $\nu_{d5} = 40.10$ |
| $r_{10} = -5.4552$(Aspheric) | $d_{10} = 0.2500$ | | |
| $r_{11} = \infty$ | $d_{11} = 1.6000$ | $n_{d6} = 1.51633$ | $\nu_{d8} = 64.15$ |
| $r_{12} = \infty$ | $d_{12} = 2.0200$ | $n_{d7} = 1.51633$ | $\nu_{d7} = 64.15$ |
| $r_{13} = \infty$ | $d_{13} = 1.6000$ | | |
| $r_{14} = \infty$ | $d_{14} = 0.7500$ | $n_{d8} = 1.48749$ | $\nu_{d8} = 70.21$ |
| $r_{15} = \infty$ | $d_{15} = 1.5700$ | | |
| $r_{16} = \infty$ (Image plane) | | | |

Aspherical Coefficients

7th surface $K = 0$
$A_4 = 8.2050 \times 10^{-7}$
$A_6 = 3.5990 \times 10^{-8}$
$A_8 = 2.7916 \times 10^{-8}$
$A_{10} = 3.5372 \times 10^{-9}$ 10th surface $K = 0$
$A_4 = 1.0962 \times 10^{-3}$
$A_6 = 2.1851 \times 10^{-5}$
$A_8 = 1.7086 \times 10^{-6}$
$A_{10} = -4.4857 \times 10^{-8}$

| | |
|---|---|
| $f = 5.0304$ | $F_{NO} = 2.8$ |
| $\phi_{DOE}/\phi = 0.12347$ | $D_{DOE}/f = 0.57756$ |
| $\phi_{REF}/\phi = 0$ | $EXP_{DOE}/f = 0.503$ |
| $f/f_F = -0.34458$ | $D_{FS}/f = 1.52739$ |
| $R_{12}/D_{2S} = 0.83145$ | $(R_1 + R_2)/(R_1 - R_2) = 0.49448$ |
| $D_{SL}/f = 1.37189$ | $(R_a + R_b)/(R_a - R_b) = 1.61888$ |

Example 8

| | | | |
|---|---|---|---|
| $r_1 = 12.6201$(Aspheric) | $d_1 = 2.2412$ | $n_{d1} = 1.49241$ | $\nu_{d1} = 57.66$ |
| $r_2 = 261.4476$ | $d_2 = 0.1500$ | | |
| $r_3 = 19.0590$ | $d_3 = 0.7000$ | $n_{d2} = 1.49241$ | $\nu_{d2} = 57.66$ |
| $r_4 = 2.6155$ | $d_4 = 3.7498$ | | |
| $r_5 = \infty$ (Stop) | $d_5 = 2.9187$ | | |
| $r_6 = 18.9140$ | $d_6 = 3.3951$ | $n_{d3} = 1.67790$ | $\nu_{d3} = 55.33$ |
| $r_7 = -5.2254$(Aspheric) | $d_7 = 1.4776$ | | |
| $r_8 = 7.800 \times 10^4$ (Aspheric) | $d_8 = 0$ | $n_{d4} = 1000$ | $\nu d_4 = -3.45$ |
| $r_9 = \infty$ | $d_9 = 1.5000$ | $n_{d5} = 1.49241$ | $\nu_{d5} = 57.66$ |
| $r_{10} = \infty$ | $d_{10} = 1.1500$ | | |
| $r_{11} = \infty$ | $d_{11} = 1.6000$ | $n_{d6} = 1.51633$ | $\nu_{d6} = 64.15$ |
| $r_{12} = \infty$ | $d_{12} = 2.0200$ | $n_{d7} = 1.51633$ | $\nu_{d7} = 64.15$ |
| $r_{13} = \infty$ | $d_{13} = 1.6000$ | | |
| $r_{14} = \infty$ | $d_{14} = 0.7500$ | $n_{d8} = 1.48749$ | $\nu_{d8} = 70.21$ |
| $r_{15} = \infty$ | $d_{15} = 0.9899$ | | |
| $r_{16} = \infty$ (Image plane) | | | |

Aspherical Coefficients

1st surface $K = 0$
$A_4 = 3.5131 \times 10^{-4}$
$A_6 = -7.5155 \times 10^{-6}$
$A_8 = 5.3923 \times 10^{-7}$
$A_{10} = -1.7821 \times 10^{-8}$ 7th surface $K = 0$
$A_4 = 1.5188 \times 10^{-3}$
$A_6 = -4.5506 \times 10^{-6}$
$A_8 = 3.7380 \times 10^{-7}$
$A_{10} = 2.0762 \times 10^{-9}$ 8th surface $K = 0$
$A_4 = 3.2781 \times 10^{-7}$
$A_6 = -2.6210 \times 10^{-8}$
$A_8 = 0$
$A_{10} = 0$

| | |
|---|---|
| $f = 5.1587$ | $F_{NO} = 2.8$ |
| $\phi_{DOE}/\phi = 0.06614$ | $D_{DOE}/f = 1.51034$ |
| $\phi_{REF}/\phi = 0.80561$ | $EXP_{DOE}/f = 7.183$ |
| $f/f_F = -0.56404$ | $D_{FS}/f = 1.32610$ |
| $R_{12}/D_{2S} = 0.69750$ | $(R_1 + R_2)/(R_1 - R_2) = 0.5670$ |
| $D_{SL}/f = 1.80110$ | $(R_a + R_b)/(R_a - R_b) = 1.31812$ |

Example 9

-continued

| | | | |
|---|---|---|---|
| $r_1 = 8.4983$(Aspheric) | $d_1 = 1.6512$ | $n_{d1} = 1.49241$ | $\nu_{d1} = 57.66$ |
| $r_2 = 2.8359$ | $d_2 = 7.0039$ | | |
| $r_3 = \infty$ (Stop) | $d_3 = 1.0384$ | | |
| $r_4 = 21.9781$ | $d_4 = 2.9285$ | $n_{d2} = 1.49241$ | $\nu_{d2} = 57.66$ |
| $r_5 = -5.3400$(Aspheric) | $d_5 = 2.8248$ | | |
| $r_6 = 11.6428$ | $d_6 = 3.0503$ | $n_{d3} = 1.49241$ | $\nu_{d3} = 57.66$ |
| $r_7 = -1021.0511$ | $d_7 = 0$ | $n_{d4} = 1000$ | $\nu_{d4} = -3.45$ |
| $r_8 = -1004.8016$(Aspheric) | $d_8 = 0.6763$ | | |
| $r_9 = \infty$ | $d_9 = 1.6000$ | $n_{d5} = 1.51633$ | $\nu_{d5} = 64.15$ |
| $r_{10} = \infty$ | $d_{10} = 2.0200$ | $n_{d6} = 1.51633$ | $\nu_{d6} = 64.15$ |
| $r_{11} = \infty$ | $d_{11} = 1.6000$ | | |
| $r_{12} = \infty$ | $d_{12} = 0.7500$ | $n_{d7} = 1.48749$ | $\nu_{d7} = 70.21$ |
| $r_{13} = \infty$ | $d_{13} = 1.0248$ | | |
| $r_{14} = \infty$ (Image plane) | | | |

Aspherical Coefficients

1st surface $K = 0$
$A_4 = 4.7735 \times 10^{-4}$
$A_6 = 4.1743 \times 10^{-5}$
$A_8 = -1.5939 \times 10^{-6}$
$A_{10} = 7.1802 \times 10^{-8}$ 5th surface $K = 0$
$A_4 = 1.0079 \times 10^{-3}$
$A_6 = 1.8064 \times 10^{-5}$
$A_8 = 1.8681 \times 10^{-5}$
$A_{10} = 2.1173 \times 10^{-6}$ 8th surface $K = 0$
$A_4 = 9.9672 \times 10^{-8}$
$A_6 = 1.7085 \times 10^{-8}$
$A_8 = 0$
$A_{10} = 0$

| | |
|---|---|
| $f = 5.0476$ | $F_{NO} = 2.8$ |
| $\phi_{DOE}/\phi = 0.07995$ | $D_{DOE}/f = 1.94983$ |
| $C_{DOE} \cdot f = -0.00494$ | $\phi_{REF}/\phi = 0.69638$ |
| $f/f_F = 0.52778$ | $D_{FS}/f = 1.71468$ |
| $R_{12}/D_{2S} = 0.40491$ | $(R_1 + R_2)/(R_1 - R_2) = 0.60905$ |
| $(R_3 + R_4)/(R_3 - R_4) = -0.97745$ | |
| $D_{SL}/f = 1.94983$ | $(R_a + R_b)/(R_a - R_b) = 2.00167$ |

Example 10

| | | | |
|---|---|---|---|
| $r_1 = 12.0309$(Aspheric) | $d_1 = 1.8462$ | $n_{d1} = 1.49241$ | $\nu_{d1} = 57.66$ |
| $r_2 = 2.7023$ | $d_2 = 5.2608$ | | |
| $r_3 = \infty$ (Stop) | $d_3 = 1.0005$ | | |
| $r_4 = 18.6613$ | $d_4 = 3.1381$ | $n_{d2} = 1.49241$ | $\nu_{d2} = 57.66$ |
| $r_5 = -5.1819$(Aspheric) | $d_5 = 2.3912$ | | |
| $r_6 = 19.9615$ | $d_6 = 3.0885$ | $n_{d3} = 1.49241$ | $\nu_{d3} = 57.66$ |
| $r_7 = 19.1445$ | $d_7 = 0$ | $n_{d4} = 1000$ | $\nu_{d4} = 3.45$ |
| $r_8 = -19.1084$(Aspheric) | $d_8 = 1.5465$ | | |
| $r_9 = \infty$ | $d_9 = 1.6000$ | $n_{d5} = 1.51633$ | $\nu_{d5} = 64.15$ |
| $r_{10} = \infty$ | $d_{10} = 2.0200$ | $n_{d6} = 1.51633$ | $\nu_{d6} = 64.15$ |
| $r_{11} = \infty$ | $d_{11} = 1.6000$ | | |
| $r_{12} = \infty$ | $d_{12} = 0.7500$ | $n_{d7} = 1.48749$ | $\nu_{d7} = 70.21$ |
| $r_{13} = \infty$ | $d_{13} = 0.9392$ | | |
| $r_{14} = \infty$ (Image plane) | | | |

Aspherical Coefficients

1st surface $K = 0$
$A_4 = 4.3275 \times 10^{-4}$
$A_6 = 5.6071 \times 10^{-5}$
$A_8 = -4.7597 \times 10^{-6}$
$A_{10} = 1.7171 \times 10^{-7}$ 5th surface $K = 0$
$A_4 = 9.6000 \times 10^{-4}$
$A_6 = 1.9302 \times 10^{-5}$
$A_8 = -1.6553 \times 10^{-5}$ $A_{10} = 1.9197 \times 10^{-6}$ 8th surface $K = 0$
$A_4 = 8.8415 \times 10^{-8}$
$A_6 = 9.8677 \times 10^{-9}$
$A_8 = 0$
$A_{10} = 0$

| | |
|---|---|
| $f = 4.9168$ | $F_{NO} = 2.8$ |
| $\phi_{DOE}/\phi = 0.08284$ | $D_{DOE}/f = 1.95619$ |
| $C_{DOE} \cdot f = -0.25723$ | $\phi_{REF}/\phi = 0.70161$ |
| $f/f_F = -0.64934$ | $D_{FS}/f = 1.44545$ |
| $R_{12}/D_{2S} = 0.51366$ | $(R_1 + R_2)/(R_1 - R_2) = 0.56533$ |
| $(R_3 + R_4)/(R_3 - R_4) = 0.02168$ | |
| $D_{SL}/f = 1.65619$ | $(R_a + R_b)/(R_a - R_b) = 1.57936$ |

Example 11

| | | | |
|---|---|---|---|
| $r_1 = 7.8340$(Aspheric) | $d_1 = 1.1851$ | $n_{d1} = 1.49241$ | $\nu_{d1} = 57.66$ |
| $r_2 = 2.9684$ | $d_2 = 6.0610$ | | |
| $r_3 = \infty$ (Stop) | $d_3 = 0.3533$ | | |
| $r_4 = 62.2194$ | $d_4 = 2.9938$ | $n_{d2} = 1.84666$ | $\nu_{d2} = 23.78$ |
| $r_5 = -10.4653$ | $d_5 = 1.1158$ | | |
| $r_6 = 51.3378$ | $d_6 = 3.0840$ | $n_{d3} = 1.49241$ | $\nu_{d3} = 57.66$ |
| $r_7 = -8.2970$ | $d_7 = 0$ | $n_{d4} = 1000$ | $\nu_{d4} = -3.45$ |
| $r_8 = -8.2954$(Aspheric) | $d_8 = 2.067$ | | |
| $r_9 = \infty$ | $d_9 = 1.6000$ | $n_{d5} = 1.51633$ | $\nu_{d5} = 64.15$ |
| $r_{10} = \infty$ | $d_{10} = 2.0200$ | $n_{d6} = 1.51633$ | $\nu_{d6} = 64.15$ |
| $r_{11} = \infty$ | $d_{11} = 1.6000$ | | |
| $r_{12} = \infty$ | $d_{12} = 0.7500$ | $n_{d7} = 1.48749$ | $\nu_{d7} = 70.21$ |
| $r_{13} = \infty$ | $d_{13} = 0.8322$ | | |
| $r_{14} = \infty$ (Image plane) | | | |

Aspherical Coefficients

1st surface $K = 0$
$A_4 = 3.1183 \times 10^{-4}$
$A_6 = 7.6221 \times 10^{-5}$
$A_8 = -6.4538 \times 10^{-6}$
$A_{10} = 2.5395 \times 10^{-7}$ 8th surface $K = 0$
$A_4 = 4.7654 \times 10^{-7}$
$A_6 = 6.4658 \times 10^{-9}$
$A_8 = 0$
$A_{10} = 0$

| | |
|---|---|
| $f = 5.1059$ | $F_{NO} = 2.8$ |
| $\phi_{DOE}/\phi = 0.11428$ | $D_{DOE}/f = 1.47808$ |
| $C_{DOE} \cdot f = -0.61539$ | $\phi_{REF}/\phi = 0.71794$ |
| $f/f_F = -0.48378$ | $D_{FS}/f = 1.41915$ |
| $R_{12}/D_{2S} = 0.48976$ | $(R_1 + R_2)/(R_1 - R_2) = 0.71204$ |
| $(R_3 + R_4)/(R_3 - R_4) = 0.72174$ | |
| $D_{SL}/f = 1.47808$ | $(R_a + R_b)/(R_a - R_b) = 2.22015$ |

Example 12

| | | | |
|---|---|---|---|
| $r_1 = 5.6204$(Aspheric) | $d_1 = 1.7029$ | $n_{d1} = 1.49241$ | $\nu_{d1} = 57.66$ |
| $r_2 = 2.5562$ | $d_2 = 5.3358$ | | |
| $r_3 = \infty$ (Stop) | $d_3 = 1.2757$ | | |
| $r_4 = 13.1472$ | $d_4 = 1.8755$ | $n_{d2} = 1.84666$ | $\nu_{d2} = 23.78$ |
| $r_5 = -6.5113$ | $d_5 = 0.3000$ | | |
| $r_6 = 10.9908$ | $d_6 = 4.0411$ | $n_{d3} = 1.49241$ | $\nu_{d3} = 57.66$ |
| $r_7 = 12.0290$ | $d_7 = 0$ | $n_{d4} = 1000$ | $\nu_{d4} = -3.45$ |
| $r_8 = 12.0257$(Aspheric) | $d_8 = 1.5000$ | | |
| $r_9 = \infty$ | $d_9 = 1.6000$ | $n_{d5} = 1.51633$ | $\nu_{d5} = 64.15$ |
| $r_{10} = \infty$ | $d_{10} = 2.0200$ | $n_{d6} = 1.51633$ | $\nu_{d6} = 64.15$ |
| $r_{11} = \infty$ | $d_{11} = 1.6000$ | | |
| $r_{12} = \infty$ | $d_{12} = 0.7500$ | $n_{d7} = 1.48749$ | $\nu_{d7} = 70.21$ |
| $r_{13} = \infty$ | $d_{13} = 0.9505$ | | |
| $r_{14} = \infty$ (Image plane) | | | |

Aspherical Coefficients

1st surface

-continued

K = 0
$A_4 = 4.0173 \times 10^{-4}$
$A_6 = 9.5387 \times 10^{-5}$
$A_8 = -8.0095 \times 10^{-6}$
$A_{10} = 4.3187 \times 10^{-7}$
8th surface K = 0
$A_4 = 3.6488 \times 10^{-7}$
$A_6 = 3.2784 \times 10^{-9}$
$A_8 = 0$
$A_{10} = 0$ f = 5.1500  $F_{NO}$ = 2.8
$\phi_{DOE}/\phi$ = 0.11922  $D_{DOE}/f$ = 1.45482
$C_{DOE} \cdot f$ = −0.42813  $\phi_{REF}/\phi$ = 0.77341
$f/f_F$ = −0.4417  $D_{FS}/f$ = 1.36674
$R_{12}/D_{2S}$ = 0.47906  $(R_1 + R_2)/(R_1 − R_2)$ = 2.96241
$(R_3 + R_4)/(R_3 − R_4)$ = −0.0451
$D_{SL}/f$ = 1.45482  $(R_a + R_b)/(R_a − R_b)$ = 2.66839

Example 13

$r_1$ = 4.4818(Aspheric)  $d_1$ = 1.4811  $n_{d1}$ = 1.49241  $v_{d1}$ = 57.66
$r_2$ = 2.1244  $d_2$ = 3.4094
$r_3 = \infty$ (Stop)  $d_3$ = 0.9686
$r_4$ = −13.4317  $d_4$ = 1.8080  $n_{d2}$ = 1.84666  $v_{d2}$ = 23.78
$r_5$ = −5.5042  $d_5$ = 1.0360
$r_6$ = 61.4615  $d_6$ = 3.7542  $n_{d3}$ = 1.58423  $v_{d3}$ = 30.49
$r_7$ = −7.8046  $d_7$ = 0  $n_{d4}$ = 1000  $v_{d4}$ = −3.45
$r_8$ = −7.8027(Aspheric)  $d_8$ = 1.0000
$r_9 = \infty$  $d_9$ = 1.6000  $n_{d5}$ = 1.51633  $v_{d5}$ = 64.15
$r_{10} = \infty$  $d_{10}$ = 2.0200  $n_{d6}$ = 1.51633  $v_{d6}$ = 64.15
$r_{11} = \infty$  $d_{11}$ = 1.6000
$r_{12} = \infty$  $d_{12}$ = 0.7500  $n_{d7}$ = 1.48749  $v_{d7}$ = 70.21
$r_{13} = \infty$  $d_{13}$ = 0.9500
$r_{14} = \infty$ (Image plane)

Aspherical Coefficients

1st surface

K = 0
$A_4 = 7.7177 \times 10^{-4}$
$A_6 = 1.0372 \times 10^{-4}$
$A_8 = -8.1160 \times 10^{-6}$
$A_{10} = 1.1585 \times 10^{-6}$
8th surface K = 0
$A_4 = 4.7317 \times 10^{-7}$
$A_6 = 9.2576 \times 10^{-9}$
$A_8 = 0$
$A_{10} = 0$ f = 5.0001  $F_{NO}$ = 2.8
$\phi_{DOE}/\phi$ = 0.156  $D_{DOE}/f$ = 1.51315
$C_{DOE} \cdot f$ = −0.64073  $\phi_{REF}/\phi$ = 0.80841
$f/f_F$ = −0.48327  $D_{FS}/f$ = 0.97798
$R_{12}/D_{2S}$ = 0.62311  $(R_1 + R_2)/(R_1 − R_2)$ = 2.38864
$(R_3 + R_4)/(R_3 − R_4)$ = 0.77465
$D_{SL}/f$ = 1.51315  $(R_a + R_b)/(R_a − R_b)$ = 2.80241

Example 14

$r_1$ = 10.0529(Aspheric)  $d_1$ = 0.8177  $n_{d1}$ = 1.52542  $v_{d1}$ = 55.78
$r_2$ = 4.1302(Aspheric)  $d_2$ = 7.7846
$r_3 = \infty$ (Stop)  $d_3$ = 2.1456
$r_4$ = 11.5464(Aspheric)  $d_4$ = 2.0451  $n_{d2}$ = 1.52542  $v_{d2}$ = 55.78
$r_5$ = −5.2476  $d_5$ = 0  $n_{d3}$ = 1000  $v_{d3}$ = −3.45
$r_6$ = −5.2473(Aspheric)  $d_6$ = 3.0000
$r_7 = \infty$  $d_7$ = 1.6000  $n_{d4}$ = 1.51633  $v_{d4}$ = 64.15
$r_8 = \infty$  $d_8$ = 2.0200  $n_{d5}$ = 1.51633  $v_{d5}$ = 64.15
$r_9 = \infty$  $d_9$ = 1.6000
$r_{10} = \infty$  $d_{10}$ = 0.7500  $n_{d6}$ = 1.48749  $v_{d6}$ = 70.21
$r_{11} = \infty$  $d_{11}$ = 1.2128
$r_{12} = \infty$ (Image plane)

Aspherical Coefficients

-continued

1st surface

K = 0
$A_4 = 6.2286 \times 10^{-3}$
$A_6 = -3.3614 \times 10^{-4}$
$A_8 = 2.2964 \times 10^{-5}$
$A_{10} = -5.8357 \times 10^{-7}$
2nd surface K = 0
$A_4 = 8.3847 \times 10^{-3}$
$A_6 = -5.9485 \times 10^{-5}$
$A_8 = 8.4662 \times 10^{-6}$
$A_{10} = 4.3637 \times 10^{-6}$
4th surface K = 0
$A_4 = -1.4591 \times 10^{-3}$
$A_6 = 6.0927 \times 10^{-5}$
$A_8 = -6.4239 \times 10^{-5}$
$A_{10} = 8.9952 \times 10^{-6}$
6th surface K = 0
$A_4 = 4.3366 \times 10^{-7}$
$A_6 = -4.5855 \times 10^{-8}$
$A_8 = 1.9687 \times 10^{-9}$
$A_{10} = 0$ f = 5.1998  $F_{NO}$ = 2.8
$\phi_{DOE}/\phi$ = 0.0609  $D_{DOE}/f$ = 0.80592
$C_{DOE} \cdot f$ = −0.99088  $\phi_{REF}/\phi$ = 0.72549
$f/f_F$ = −0.37118  $D_{FS}/f$ = 1.65435
$R_{12}/D_{2S}$ = 0.53057  $(R_3 + R_4)/(R_3 − R_4)$ = 0.37506
$D_{SL}/f$ = 0.80592  $(R_a + R_b)/(R_a − R_b)$ = 2.39471

Example 15

$r_1$ = 12.1305(Aspheric)  $d_1$ = 0.8000  $n_{d1}$ = 1.49241  $v_{d1}$ = 57.66
$r_2$ = 3.1060  $d_2$ = 6.5548
$r_3 = \infty$ (Stop)  $d_3$ = 2.7536
$r_4$ = 19.8757(Aspheric)  $d_4$ = 3.0691  $n_{d2}$ = 1.49241  $v_{d2}$ = 57.66
$r_5$ = −4.5079  $d_5$ = 0  $n_{d3}$ = 1000  $v_{d3}$ = −3.45
$r_6$ = −4.5078(Aspheric)  $d_6$ = 5.0000
$r_7 = \infty$  $d_7$ = 1.6000  $n_{d4}$ = 1.51633  $v_{d4}$ = 64.15
$r_8 = \infty$  $d_8$ = 2.0200  $n_{d5}$ = 1.51633  $v_{d5}$ = 64.15
$r_9 = \infty$  $d_9$ = 1.6000
$r_{10} = \infty$  $d_{10}$ = 0.7500  $n_{d6}$ = 1.48749  $v_{d6}$ = 70.21
$r_{11} = \infty$  $d_{11}$ = 1.7126
$r_{12} = \infty$ (Image plane)

Aspherical Coefficients

1st surface

K = 0
$A_4 = 1.2001 \times 10^{-3}$
$A_6 = -1.8605 \times 10^{-5}$
$A_8 = -2.0195 \times 10^{-6}$
$A_{10} = 2.1873 \times 10^{-7}$
4th surface K = 0
$A_4 = -2.1550 \times 10^{-3}$
$A_6 = -1.8918 \times 10^{-4}$
$A_8 = 8.5214 \times 10^{-6}$
$A_{10} = 2.5258 \times 10^{-8}$
6th surface K = 0
$A_4 = 3.4561 \times 10^{-7}$
$A_6 = -2.4669 \times 10^{-8}$
$A_8 = 0$
$A_{10} = 0$ f = 5.1506  $F_{NO}$ = 2.8
$\phi_{DOE}/\phi$ = 0.04829  $D_{DOE}/f$ = 1.13052
$C_{DOE} \cdot f$ = −1.14255  $\phi_{REF}/\phi$ = 0.66155
$f/f_F$ = −0.58971  $D_{FS}/f$ = 1.42796
$R_{12}/D_{2S}$ = 0.47384  $(R_3 + R_4)/(R_3 − R_4)$ = 0.63025

-continued

| $D_{SL}/f = 1.13052$ | $(R_a + R_b)/(R_a - R_b) = 1.68834$ |
|---|---|

Example 16

| $r_1 = 5.2075$ (Aspheric) | $d_1 = 1.0142$ | $n_{d1} = 1.49241$ | $v_{d1} = 57.66$ |
|---|---|---|---|
| $r_2 = 2.4698$ | $d_2 = 3.5541$ | | |
| $r_3 = \infty$ (Stop) | $d_3 = 1.9017$ | | |
| $r_4 = 95.5457$ (Aspheric) | $d_4 = 3.1192$ | $n_{d2} = 1.58423$ | $v_{d2} = 30.49$ |
| $r_5 = -3.8364$ | $d_5 = 0$ | $n_{d3} = 1000$ | $v_{d3} = -3.45$ |
| $r_6 = -3.8361$ (Aspheric) | $d_6 = 3.0160$ | | |
| $r_7 = \infty$ | $d_7 = 1.6000$ | $n_{d4} = 1.51633$ | $v_{d4} = 64.15$ |
| $r_8 = \infty$ | $d_8 = 2.0200$ | $n_{d5} = 1.51633$ | $v_{d5} = 64.15$ |
| $r_9 = \infty$ | $d_9 = 1.6000$ | | |
| $r_{10} = \infty$ | $d_{10} = 0.7500$ | $n_{d6} = 1.48749$ | $v_{d6} = 70.21$ |
| $r_{11} = \infty$ | $d_{11} = 0.5838$ | | |
| $r_{12} = \infty$ (Image plane) | | | |

Aspherical Coefficients

1st surface $K = 0$
$A_4 = 8.1523 \times 10^{-4}$
$A_6 = -1.3352 \times 10^{-5}$
$A_8 = 5.0095 \times 10^{-6}$
$A_{10} = 5.6386 \times 10^{-12}$ 4th surface $K = 0$
$A_4 = -4.8364 \times 10^{-3}$
$A_6 = -2.1115 \times 10^{-4}$
$A_8 = -4.6375 \times 10^{-5}$
$A_{10} = 6.8037 \times 10^{-6}$ 6th surface $K = 0$
$A_4 = 3.7138 \times 10^{-7}$
$A_6 = -4.4845 \times 10^{-9}$
$A_8 = 0$
$A_{10} = 0$

| $f = 5.0523$ | $F_{NO} = 2.8$ |
|---|---|
| $\phi_{DOE}/\phi = 0.11752$ | $D_{DOE}/f = 0.9938$ |
| $C_{DOE} \cdot f = -1.31693$ | $\phi_{REF}/\phi = 0.79102$ |
| $f/f_F = -0.46482$ | $D_{FS}/f = 0.90422$ |
| $R_{12}/D_{2S} = 0.69491$ | $(R_3 + R_4)/(R_3 - R_4) = 0.92279$ |
| $D_{SL}/f = 0.99379$ | $(R_a + R_b)/(R_a - R_b) = 2.80432$ |

As can be understood from the above explanations, the present invention can provide an inexpensive phototaking lens system comprising a reduced number of lenses, which makes use of a diffractive optical element to make good correction for first-order longitudinal chromatic aberration and chromatic aberration of magnification while high image-forming capability is maintained even at peripheral areas of the field angle, and which can eliminate higher-order chromatic aberrations of magnification produced in a wide-angle lens system.

What we claim is:

1. A phototaking lens system comprising, in order from an object side thereof, a front lens group having negative power, an aperture stop, and a rear lens group having positive power, wherein:

said front lens group comprises a lens that is convex on said object side and located closest to said object side of said phototaking lens system, said rear lens group comprises at least one positive lens and a diffractive optical element having a diffractive surface having positive power, said phototaking lens system satisfies the following conditions (1) and (2):

$$0.02 < \phi_{DOE}/\phi < 0.20 \tag{1}$$

$$0.2 < D_{DOE}/f < 3.0 \tag{2}$$

where $\phi$, and f are a power and a focal length of said phototaking lens system, respectively, $\phi_{DOE}$ is a power of said diffractive surface from which a power of a diffractive optical element substrate is excluded, and $D_{DOE}$ is a distance from said aperture stop to said diffractive surface, and an exit pupil position of an optical subsystem located between said diffractive surface and said object side is located in a range defined by the following condition (4):

$$-0.2 < f/EXP_{DOE} < 0.42 \tag{4}$$

where $EXP_{DOE}$ is a distance from said exit pupil position to said diffractive surface.

2. A phototaking lens system of claim 1, wherein said front lens group is constructed of a positive lens that is convex on the object side and a lens of negative power, and at least one positive lens in said rear group is a double-convex lens.

3. A phototaking lens system as recited in claim 1, which further comprises a refractive optical element located between said aperture stop and said diffractive surface, said refractive optical element having a refractive action in a range defined by the following condition (3):

$$0 < \phi_{REF}/\phi < 0.9 \tag{3}$$

where $\phi_{REF}$ is a power of all refractive optical elements located between said aperture stop and said diffractive surface, and $\phi$ is a power of the entire system.

4. A phototaking lens system comprising, in order from an object side thereof, a front lens group having negative power, an aperture stop, and a rear lens group having positive power, wherein:

said front lens group comprises a lens that is convex on said object side and located closest to said object side of said phototaking lens system, said rear lens group comprises at least one positive lens and a diffractive optical element having a diffractive surface having positive power, said phototaking lens system satisfies the following conditions (1) and (2):

$$0.02 < \phi_{DOE}/\phi < 0.20 \tag{1}$$

$$0.2 < D_{DOE}/f < 3.0 \tag{2}$$

where $\phi$ and f are a power and a focal length of said phototaking lens system, respectively, $\phi_{DOE}$ is a power of said diffractive surface from which a power of a diffractive optical element substrate is excluded, and $D_{DOE}$ is a distance from said aperture stop to said diffractive surface, wherein said phototaking lens system further satisfies the following conditions (5) and (6):

$$-0.8 < f/f_F < -0.2 \tag{5}$$

$$0.5 < D_{FS}/f < 2.2 \tag{6}$$

where $f_F$ is a focal length of said front group, and $D_{FS}$ is a distance from an apex of an object-side surface in the front group to said aperture stop.

5. A phototaking lens system comprising, in order from an object side thereof, a front lens group having negative power, an aperture stop, and a rear lens group having positive power, wherein:

said front lens group comprises a lens that is convex on said object side and located closest to said object side of said phototaking lens system, said rear lens group comprises at least one positive lens and a diffractive optical element having a diffractive surface having positive power, said phototaking lens system satisfies the following conditions (1) and (2):

$$0.02 < |\phi_{DOE}| < 0.20 \quad (1)$$

$$0.2 < D_{DOE}/f < 3.0 \quad (2)$$

where $\phi$ and f are a power and a focal length of said phototaking lens system, respectively, $\phi_{DOE}$ is a power of said diffractive surface from which a power of a diffractive optical element substrate is excluded, and $D_{DOE}$ is a distance from said aperture stop to said diffractive surface, wherein said phototaking lens system further satisfies the following conditions (7) and (8):

$$0.2 < R_{12}/D_{2S} < 1.2 \quad (7)$$

$$-1.0 < (R_1+R_2)/R_1-R_2) < 5.0 \quad (8)$$

where $R_{12}$ is a radius of curvature of a surface in the front group, said surface closest to an image side of the phototaking lens system, $D_{2S}$ is a distance of said surface in the front group to the aperture stop, and $R_1$ and $R_2$ are paraxial radii of curvature of a refractive lens component in the rear group, as determined on the object side and image side, respectively.

6. A phototaking lens system of claim 4 or 5 wherein between said aperture stop and said diffractive surface there is included a refractive optical element having refracting action lying within a range defined by the following condition (3) and an exit pupil position of an optical subsystem located between said diffractive surface and said object side lies within a range defined by the following condition (4):

$$0 < \phi_{REF}/\phi < 0.9$$

$$-0.2 < f/EXP_{DOE} < 0.42 \quad (4)$$

where $\phi_{REF}$ is a power of all refractive optical elements between said aperture stop and said diffractive surface, and $EXP_{DOE}$ is a distance from said exit pupil position to said diffractive surface.

7. A phototaking lens system of claim 4 or 5, wherein said front group consists only of a meniscus lens of negative power that is convex on the object side, and at least one positive lens in said rear group is a double-convex lens.

8. A phototaking lens system comprising, in order form an object side thereof, a front lens group having negative power, an aperture stop, and a rear lens group having positive power, wherein:

said front lens group comprises a lens that is convex on said object side and located closest to said object side of said phototaking lens system, said rear lens group comprises at least one diffractive optical element in which a diffractive surface having positive power is defined by a surface having a given curvature, and said phototaking lens system satisfies the following conditions (1) and (2):

$$0.02 < |\phi_{DOE}| < 0.20 \quad (1)$$

$$0.2 < D_{DOE}/f < 3.0 \quad (2)$$

where $\phi$ and f are a power and a focal length of said phototaking lens system, respectively, $\phi_{DOE}$ is a power of said diffractive surface from which a power of a diffractive optical element substrate is excluded, and $D_{DOE}$ is a distance from said aperture stop to said diffractive surface, wherein said phototaking lens system further satisfies the following conditions (5) and (6):

$$-0.8 < f/f_F < -0.2 \quad (5)$$

$$0.5 < D_{FS}/f < 2.2 \quad (6)$$

where $f_F$ is a focal length of said front lens group, and $D_{FS}$ is a distance from an apex of an object-side surface in the front lens group to said aperture stop.

9. A phototaking lens system comprising, in order form an object side thereof, a front lens group having negative power, an aperture stop, and a rear lens group having positive power, wherein:

said front lens group comprises a lens that is convex on said object side and located closest to said object side of said phototaking lens system, said rear lens group comprises at least one diffractive optical element in which a diffractive surface having positive power is defined by a surface having a given curvature, and said phototaking lens system satisfies the following conditions (1) and (2):

$$0.02 < |\phi_{DOE}| < 0.20 \quad (1)$$

$$0.2 < D_{DOE}/f < 3.0 \quad (2)$$

where $\phi$ and f are a power and a focal length of said phototaking lens system, respectively, $\phi_{DOE}$ is a power of said diffractive surface from which a power of a diffractive optical element substrate is excluded, and $D_{DOE}$ is a distance from said aperture stop to said diffractive surface, wherein said phototaking lens system further satisfies the following conditions (7) and (10):

$$0.2 < R_{12}/D_{2S} < 1.2 \quad (7)$$

$$-1.1 < (R_3+R_4)/(R_3R_4) < 5.0 \quad (10)$$

where $R_{12}$ is a radius of curvature of a surface in the front lens group, said surface closest to an image side of the phototaking lens system, $D_{2S}$ is a distance of said surface in the front lens group to the aperture stop, and $R_3$ and $R_4$ are paraxial radii of curvature of a substrate of said diffractive optical element having the diffractive surface in said rear lens group, as determined on the object side and image side, respectively.

10. A phototaking lens system of claim 8 or 9, wherein a curvature of a substrate of said diffractive optical element having a diffractive surface satisfies the following condition (9):

$$-8.0 < C_{DOE} \cdot f < 1.0 \qquad (9)$$

where $C_{DOE}$ is a curvature of a surface of the substrate of said diffractive optical element on which said diffractive surface is provided.

* * * * *